(12) United States Patent
Rathi et al.

(10) Patent No.: US 11,951,941 B2
(45) Date of Patent: Apr. 9, 2024

(54) METHODS AND APPARATUS FOR ENABLING CONTACTLESS COMMAND OF A VEHICLE

(71) Applicant: Nuro, Inc., Mountain View, CA (US)

(72) Inventors: Benjamin Bhanu Rathi, Novi, MI (US); John David West, San Anselmo, CA (US); Joonsik Maing, Piedmont, CA (US); Robert Irving Luan, San Jose, CA (US); David K Kim, Mountain View, CA (US); Siyu Zhan, Millbrae, CA (US)

(73) Assignee: Nuro, Inc., Mountain View, CA (US)

( * ) Notice: Subject to any disclaimer, the term of this patent is extended or adjusted under 35 U.S.C. 154(b) by 628 days.

(21) Appl. No.: 17/223,819

(22) Filed: Apr. 6, 2021

(65) Prior Publication Data

US 2021/0339704 A1     Nov. 4, 2021

Related U.S. Application Data

(60) Provisional application No. 63/019,105, filed on May 1, 2020.

(51) Int. Cl.
*B60R 25/20* (2013.01)
*B60R 16/023* (2006.01)
(Continued)

(52) U.S. Cl.
CPC .......... *B60R 25/20* (2013.01); *B60R 16/0231* (2013.01); *G07C 9/22* (2020.01);
(Continued)

(58) Field of Classification Search
CPC ..... B60R 25/20; B60R 16/0231; B60R 25/01; G07C 9/22; G07C 9/27; G07C 9/28; G07C 5/008
See application file for complete search history.

(56) References Cited

U.S. PATENT DOCUMENTS

| 6,857,073 B2 | 2/2005 | French et al. |
| 8,744,642 B2 | 6/2014 | Nemat-Nasser et al. |

(Continued)

FOREIGN PATENT DOCUMENTS

| CN | 107609529 A | 1/2018 |
| WO | 2016027178 A1 | 2/2016 |
| WO | 2017064202 A1 | 4/2017 |

*Primary Examiner* — Kyle O Logan

(57) ABSTRACT

According to one aspect, a method includes determining when a vehicle has arrived at a destination and performing a first authentication process when it is determined that the vehicle has arrived at the destination. The first authentication process being arranged to authenticate a first party to enable the first party to interact with the vehicle. The method also includes determining when the first party has successfully completed the first authentication process, performing a second process when it is determined that the first party has successfully completed the first authentication process, determining whether the second process is successfully completed, and enabling the first party to interact with the vehicle when it is determined that the second process is successfully completed. Performing the second process includes determining when the first party is present within the sensing zone. The first authentication process and the second process are contactless with respect to the vehicle.

21 Claims, 20 Drawing Sheets

(51) Int. Cl.
  *G07C 9/22*   (2020.01)
  *G07C 9/27*   (2020.01)
  *G07C 9/28*   (2020.01)
  *B60R 25/01*   (2013.01)
  *G07C 5/00*   (2006.01)

(52) U.S. Cl.
  CPC ............... *G07C 9/27* (2020.01); *G07C 9/28* (2020.01); *B60R 25/01* (2013.01); *G07C 5/008* (2013.01)

(56)   References Cited

U.S. PATENT DOCUMENTS

| | | | |
|---|---|---|---|
| 9,043,012 | B2 | 5/2015 | Davey et al. |
| 9,256,852 | B1 | 2/2016 | Myllymaki |
| 9,381,890 | B2 | 7/2016 | Lee et al. |
| 9,619,723 | B1 | 4/2017 | Chow et al. |
| 9,811,848 | B2 | 11/2017 | Reuss et al. |
| 10,310,499 | B1* | 6/2019 | Brady .................. G05D 1/0291 |
| 2014/0370167 | A1* | 12/2014 | Garden .................. G06Q 50/12 |
| | | | 99/325 |
| 2015/0006005 | A1* | 1/2015 | Yu .......................... G06Q 10/08 |
| | | | 701/22 |
| 2017/0083862 | A1* | 3/2017 | Loubriel ............ G06Q 10/0835 |
| 2018/0144302 | A1 | 5/2018 | Murray et al. |
| 2018/0165638 | A1 | 6/2018 | Wilkinson et al. |
| 2018/0330313 | A1* | 11/2018 | Clarke ................ G06Q 10/083 |
| 2019/0034858 | A1* | 1/2019 | Ferguson .................. A23L 2/52 |
| 2019/0049988 | A1* | 2/2019 | Meij ...................... G06Q 10/08 |
| 2019/0236539 | A1* | 8/2019 | McHale ............. G07C 9/00817 |
| 2022/0292436 | A1* | 9/2022 | Kawaguchi ............ G06Q 10/08 |

\* cited by examiner

METHODS AND APPARATUS FOR ENABLING CONTACTLESS COMMAND OF A VEHICLE

CROSS-REFERENCE TO RELATED APPLICATION

This application claims the benefit of priority under 35 U.S.C. § 119 to U.S. Provisional Patent Application No. 63/019,105, filed May 1, 2020, entitled "METHODS AND APPARATUS FOR ENABLING CONTACTLESS COMMAND OF A VEHICLE," which is incorporated herein by reference in its entirety.

TECHNICAL FIELD

The disclosure relates to providing an individual with the ability to command a vehicle. More particularly, the disclosure relates to providing the ability to command a vehicle in a contactless manner.

BACKGROUND

The use of delivery vehicles to deliver goods to customers is becoming more prevalent as technology which allows the delivery vehicles to operate efficiently improves. The appeal of having goods delivered is growing as customers are realizing that they can save time by not having to run errands to pick up the goods themselves.

In many cases, a customer is responsible for accessing a cargo compartment of a vehicle to remove goods when the vehicle reaches a delivery location. Often, in order for the customer to gain access to the cargo compartment, the customer is required to use a human machine interface (HMI) to unlock the cargo compartment. Once the cargo compartment is unlocked, the customer may have to physically touch a door on the cargo compartment to open the door and to effectively gain access to the cargo compartment.

BRIEF DESCRIPTION OF THE DRAWINGS

The disclosure will be readily understood by the following detailed description in conjunction with the accompanying drawings in which.

DESCRIPTION OF EXAMPLE EMBODIMENTS

General Overview

Figure 1:
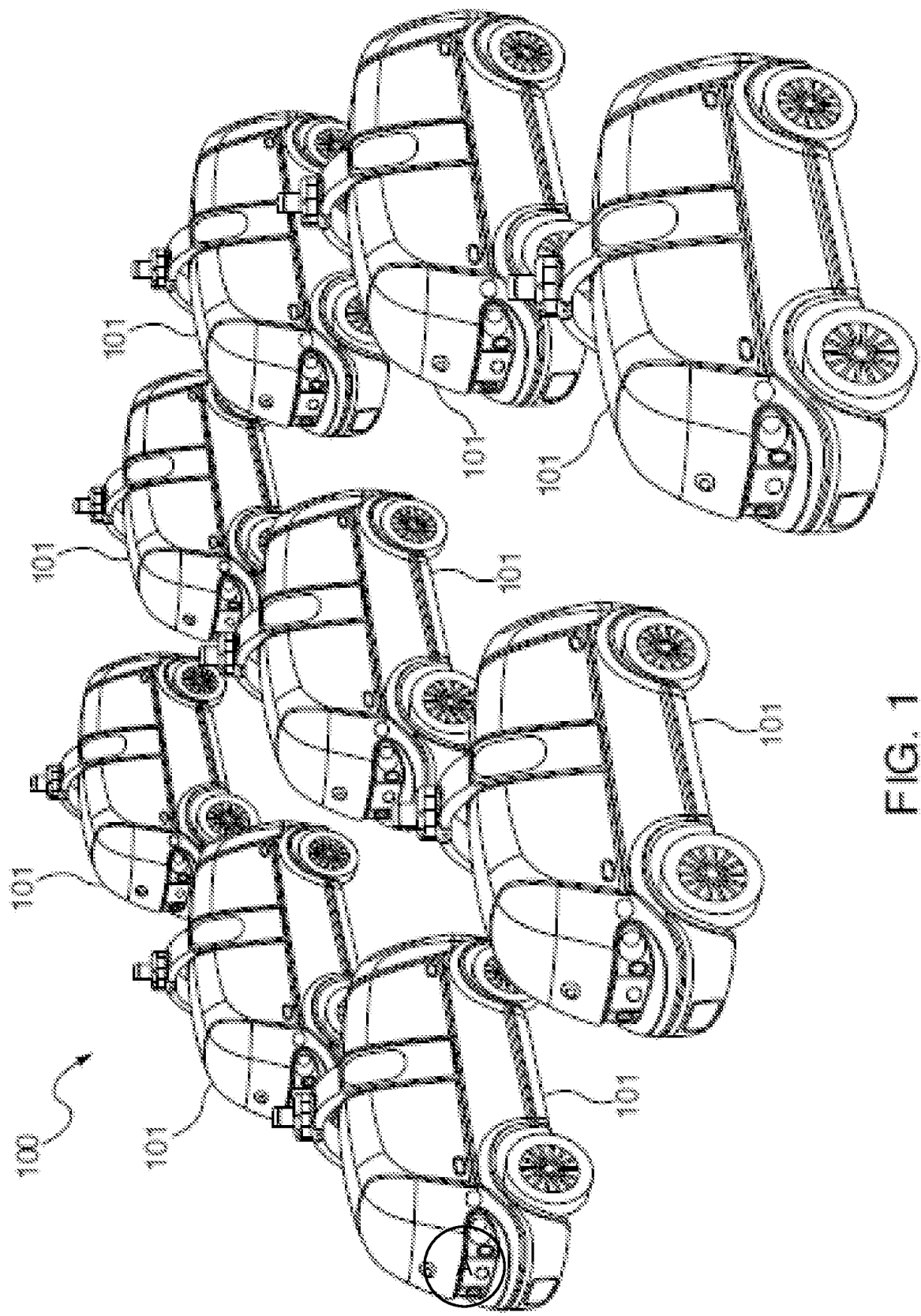
FIG. 1 is a diagrammatic representation of an autonomous vehicle fleet in accordance with an embodiment.

A vehicle such as an autonomous delivery vehicle may have at least one compartment that is arranged to be opened in a contactless manner, i.e., without requiring that a user or a customer physically touch the vehicle. Sensors on the vehicle such as a camera may detect when the user is making a motion or a series of motions, e.g., gestures or a series of gestures, and the vehicle may execute an operation that is effectively commanded by the motion or series of motions. Sensors on the vehicle may also detect when the user is making a motion or a series of motions as part of an authentication process and determine whether the user may be properly authenticated. When the user is properly authenticated, the vehicle may take an action that is consistent with what is indicated by the user through the move or series of moves. For example, the vehicle may unlock and/or open a compartment if the move or moves by the user indicate that he or she wishes to access the compartment. In some cases, other contactless techniques or methods may be utilized in order to provide a user with access to a compartment.

According to one aspect, a method includes determining when a vehicle has arrived at a destination, wherein a sensing zone is defined around the vehicle. The method also includes performing a first authentication process when it is determined that the vehicle has arrived at the destination, the first authentication process being arranged to authenticate a first party to enable the first party to interact with the vehicle. Performing the first authentication process includes the first party providing at least a first authentication indicator. Finally, the method includes determining when the first party has successfully completed the first authentication process, performing a second process when it is determined that the first party has successfully completed the first authentication process, determining whether the second process is successfully completed, and enabling the first party to interact with the vehicle when it is determined that the second process is successfully completed. Performing the second process includes determining when the first party being present within the sensing zone, and both the first authentication process and the second process are contactless with respect to the vehicle.

In accordance with another aspect, a non-transitory storage medium encoded with code devices that, when executed by at least one processor, cause the at least one processor to perform operations includes determining when a vehicle has arrived at a destination and performing a first authentication process when it is determined that the vehicle has arrived at the destination. The first authentication process authenticates a first party to enable the first party to interact with the vehicle and performing the first authentication process includes the first party providing at least a first authentication indicator. Operations also include determining when the first party has successfully completed the first authentication process, performing a second process when it is determined that the first party has successfully completed the first authentication process, determining whether the second process is successfully completed, and enabling the first party to interact with the vehicle when it is determined that the second process is successfully completed. The first authentication process and the second process are contactless with respect to the vehicle.

According to still another aspect, a platform includes at least a first vehicle, a system, and at least a first device. The first vehicle is semi-autonomous or autonomous, and a first sensing zone is defined around the first vehicle. The system communicates with the first vehicle, and includes a database configured to store information associated with a first customer. The system performs a first authentication process for the first customer with respect to the first vehicle. The first device is configured to interact with the system to perform the first authentication process, and is further configured to interact with the first vehicle after the first authentication process to perform a second process. The first device and the first vehicle cooperate to perform the second process when the first device is identified by the first vehicle as being physically located in the first sensing zone.

Description

The ability for an individual to gain access to a compartment of a vehicle, e.g., a cargo compartment of an autonomous or driverless vehicle, in a contactless or contact-free manner reduces the likelihood that the individual acquires germs, pathogens, microbes, and/or other contaminants that may be present on the vehicle. For example, if an individual may cause a door on a compartment of a vehicle to open and close without having to touch the door or touch a keypad on the vehicle, the individual is less likely to become infected with or otherwise tainted with any substances on the door and/or keypad. The ability to limit the exposure of an individual to germs such as viruses and bacteria generally reduces the chances that the individual will be infected by the viruses and bacteria. In other words, the spread of germs, pathogens, microbes, and/or other contaminants may be reduced if an individual may interact with a vehicle substantially without physically touching any part of the vehicle.

By providing a user or customer who interfaces with a vehicle such as an autonomous delivery vehicle with the ability to access a compartment of the vehicle without having to physically touch the vehicle, the user may be protected from becoming infected or contaminated with germs, pathogens, microbes, and/or other contaminants on surfaces of the vehicle. For example, if a user may signal to the vehicle that the user is requesting access to the compartment substantially without coming into physical contact with the vehicle, the likelihood that the user may become infected by germs such as viruses and bacteria that are present on the surface of the vehicle may be reduced. As a result, the risk to the health of a user may be lowered when the user does not touch surfaces of the vehicle such as a door and/or a human machine interface such as a keypad.

Delivery vehicles, e.g., autonomous or driverless delivery vehicles, which are dispatched to deliver goods to a customer and/or to pick up goods from the customer, are typically part of a fleet of vehicles that are managed by a fleet management system. Referring initially to FIG. 1, an autonomous vehicle fleet will be described in accordance with an embodiment. An autonomous vehicle fleet 100 includes a plurality of autonomous vehicles 101, or robot vehicles. Autonomous vehicles 101 are generally arranged to transport and/or to deliver cargo, items, and/or goods. Autonomous vehicles 101 may be fully autonomous and/or semi-autonomous vehicles. In general, each autonomous vehicle 101 may be a vehicle that is capable of travelling in a controlled manner for a period of time without intervention, e.g., without human intervention. As will be discussed in more detail below, each autonomous vehicle 101 may include a power system, a propulsion or conveyance system, a navigation module, a control system or controller, a communications system, a processor, and a sensor system.

Dispatching of autonomous vehicles 101 in autonomous vehicle fleet 100 may be coordinated by a fleet management module (not shown). The fleet management module may dispatch autonomous vehicles 101 for purposes of transporting, delivering, and/or retrieving goods or services in an unstructured open environment or a closed environment.

Figure 2:
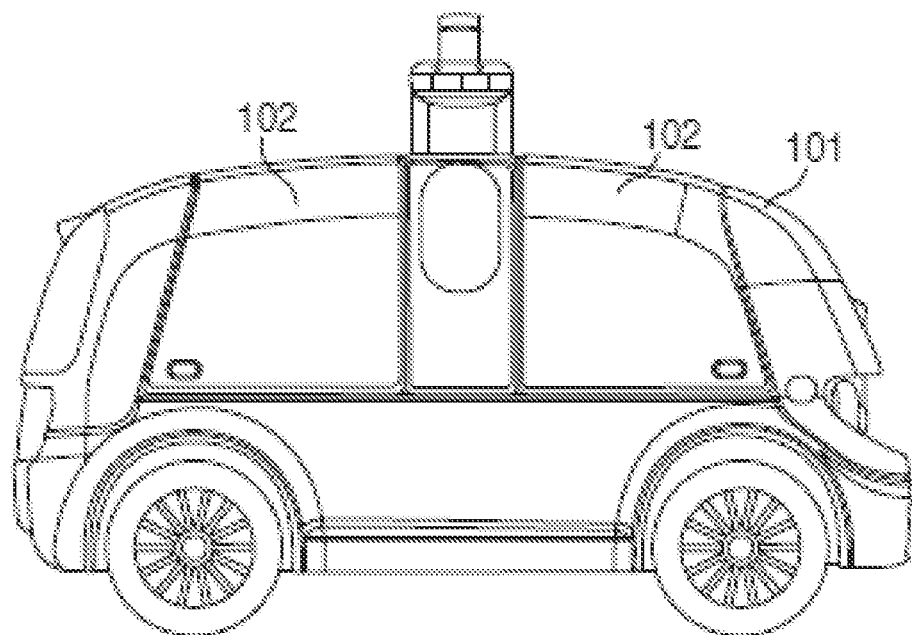
FIG. 2 is a diagrammatic representation of a side of an autonomous vehicle in accordance with an embodiment.

FIG. 2 is a diagrammatic representation of a side of an autonomous vehicle, e.g., one of autonomous vehicles 101 of FIG. 1, in accordance with an embodiment. Autonomous vehicle 101, as shown, is a vehicle configured for land travel. Typically, autonomous vehicle 101 includes physical vehicle components such as a body or a chassis, as well as conveyance mechanisms, e.g., wheels. In one embodiment, autonomous vehicle 101 may be relatively narrow, e.g., approximately two to approximately five feet wide, and may have a relatively low mass and relatively low center of gravity for stability. Autonomous vehicle 101 may be arranged to have a working speed or velocity range of between approximately one and approximately forty-five miles per hour (mph), e.g., approximately twenty-five miles per hour. In some embodiments, autonomous vehicle 101 may have a substantially maximum speed or velocity in range between approximately thirty and approximately ninety mph.

Autonomous vehicle 101 includes a plurality of compartments 102. Compartments 102 may be assigned to one or more entities, such as one or more customer, retailers, and/or vendors. Compartments 102 are generally arranged to contain cargo, items, and/or goods. Typically, compartments 102 may be secure compartments. It should be appreciated that the number of compartments 102 may vary. That is, although two compartments 102 are shown, autonomous vehicle 101 is not limited to including two compartments 102.

Figure 3:
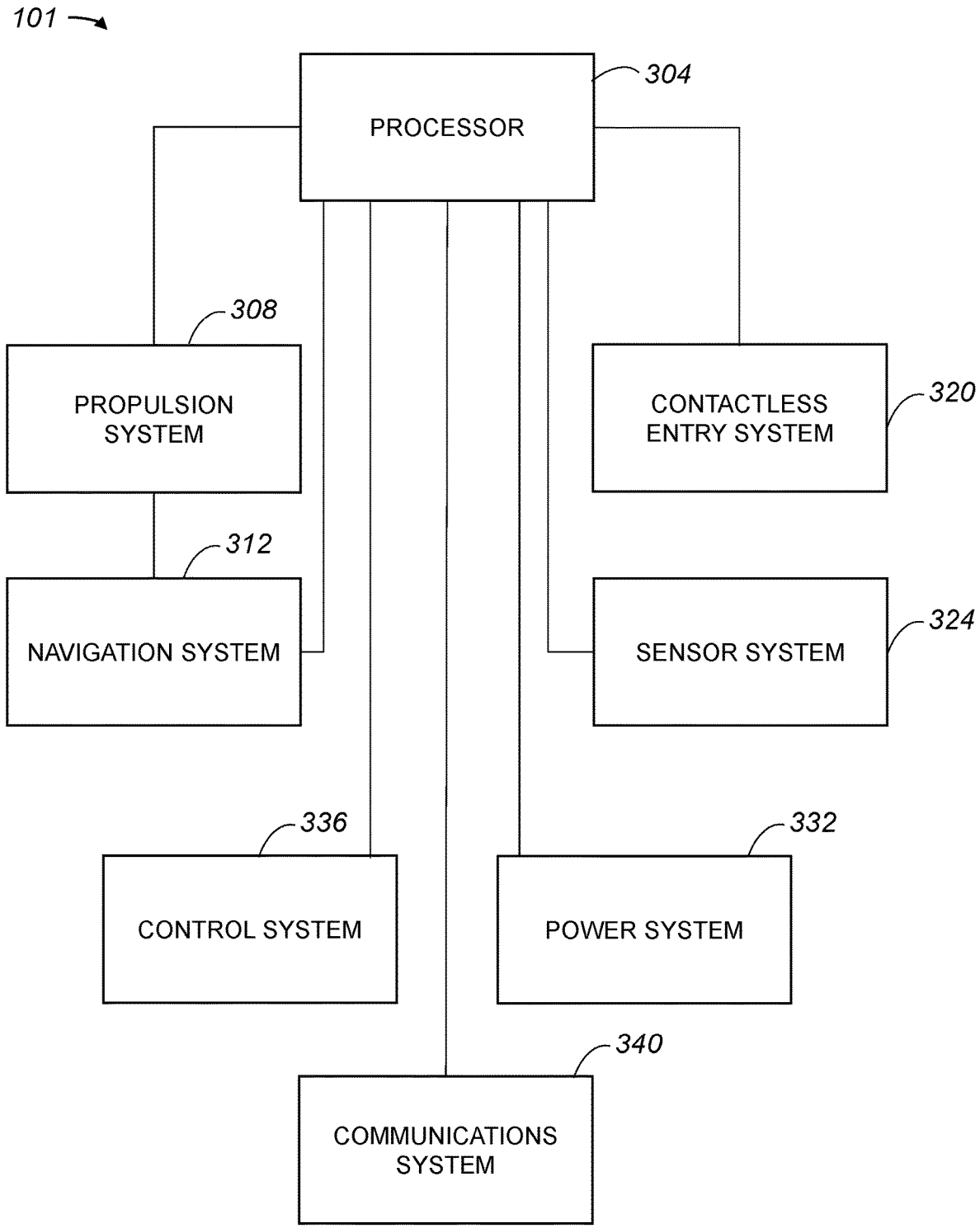
FIG. 3 is a block diagram representation of an autonomous vehicle in accordance with an embodiment.

FIG. 3 is a block diagram representation of an autonomous vehicle, e.g., autonomous vehicle 101 of FIG. 1, in accordance with an embodiment. An autonomous vehicle 101 includes a processor 304, a propulsion system 308, a navigation system 312, a contactless entry system 320, a sensor system 324, a power system 332, a control system 336, and a communications system 340. It should be appreciated that processor 304, propulsion system 308, navigation system 312, sensor system 324, power system 332, and communications system 340 are all coupled to a chassis or body of autonomous vehicle 101.

Processor 304 is arranged to send instructions to and to receive instructions from or for various components such as propulsion system 308, navigation system 312, sensor system 324, power system 332, and control system 336. Propulsion system 308, or a conveyance system, is arranged to cause autonomous vehicle 101 to move, e.g., drive. For example, when autonomous vehicle 101 is configured with a multi-wheeled automotive configuration as well as steering, braking systems and an engine, propulsion system 308 may be arranged to cause the engine, wheels, steering, and braking systems to cooperate to drive. In general, propulsion system 308 may be configured as a drive system with a propulsion engine, wheels, treads, wings, rotors, blowers, rockets, propellers, brakes, etc. The propulsion engine may be a gas engine, a turbine engine, an electric motor, and/or a hybrid gas and electric engine.

Navigation system 312 may control propulsion system 308 to navigate autonomous vehicle 101 through paths and/or within unstructured open or closed environments. Navigation system 312 may include at least one of digital maps, street view photographs, and a global positioning system (GPS) point. Maps, for example, may be utilized in cooperation with sensors included in sensor system 324 to allow navigation system 312 to cause autonomous vehicle 101 to navigate through an environment.

Contactless entry system 320 may include components which allow access to be provided to compartments 102, as shown in FIG. 2, by opening doors or hatches to compartments 102. Contactless entry system 320 may also include components which, after access to compartments 102 is provided, effectively rescind, or otherwise cancel the access. In one embodiment, contactless entry system 320 cooperates with sensor system 324 to ascertain when a user or a customer requests access to a compartment 102, and/or when the user or customer indicates that access to compartment 102 is no longer desired. Contactless entry system 320 is arranged to cause a compartment 102 to become accessible once a user is substantially authenticated and when it is determined that the user has indicated that he or she would appreciate access. Similarly, contactless entry system 320 is also arranged to cause a compartment 102 to become inaccessible when it is determined that the user has indicated that he or she would no longer needs access. In general, contactless entry system 320 includes mechanical, software, and/or electrical components which cooperate with sensor system 324 to substantially open and/or to substantially close a door to a compartment 102 of vehicle 101, e.g., when it is determined that a user is requesting opening and/or closing as appropriate, without a user having to physically touch vehicle 101.

Sensor system 324 includes any sensors, as for example LiDAR, radar, ultrasonic sensors, microphones, altimeters, and/or cameras. Sensor system 324 generally includes onboard sensors which allow autonomous vehicle 101 to safely navigate, and to ascertain when there are objects near autonomous vehicle 101. In one embodiment, sensor system 324 may include propulsion systems sensors that monitor drive mechanism performance, drive train performance, and/or power system levels. Sensors included in sensor system 324 may cooperate with contactless entry system 320 to essentially determine when a user or a customer is requesting access to a compartment 102 of vehicle 101 and/or is indicating that access is no longer needed.

Power system 332 is arranged to provide power to autonomous vehicle 101. Power may be provided as electrical power, gas power, or any other suitable power, e.g., solar power or battery power. In one embodiment, power system 332 may include a main power source, and an auxiliary power source that may serve to power various components of autonomous vehicle 101 and/or to generally provide power to autonomous vehicle 101 when the main power source does not have the capacity to provide sufficient power.

Communications system 340 allows autonomous vehicle 101 to communicate, as for example, wirelessly, with a fleet management system (not shown) that allows autonomous vehicle 101 to be controlled remotely. Communications system 340 generally obtains or receives data, stores the data, and transmits or provides the data to a fleet management system and/or to autonomous vehicles 101 within a fleet 100. The data may include, but is not limited to including, information relating to scheduled requests or orders, information relating to on-demand requests or orders, and/or information relating to a need for autonomous vehicle 101 to reposition itself, e.g., in response to an anticipated demand.

In some embodiments, control system 336 may cooperate with processor 304 to determine where autonomous vehicle 101 may safely travel, and to determine the presence of objects in a vicinity around autonomous vehicle 101 based on data, e.g., results, from sensor system 324. In other words, control system 336 may cooperate with processor 304 to effectively determine what autonomous vehicle 101 may do within its immediate surroundings. Control system 336 in cooperation with processor 304 may essentially control power system 332 and navigation system 312 as part of driving or conveying autonomous vehicle 101. Additionally, control system 336 may cooperate with processor 304 and communications system 340 to provide data to or obtain data from other autonomous vehicles 101, a management server, a global positioning server (GPS), a personal computer, a teleoperations system, a smartphone, or any computing device via the communication module 340. In general, control system 336 may cooperate at least with processor 304, propulsion system 308, navigation system 312, sensor system 324, and power system 332 to allow vehicle 101 to operate autonomously. That is, autonomous vehicle 101 is able to operate autonomously through the use of an autonomy system that effectively includes, at least in part, functionality provided by propulsion system 308, navigation system 312, sensor system 324, power system 332, and control system 336.

As will be appreciated by those skilled in the art, when autonomous vehicle 101 operates autonomously, vehicle 101 may generally operate, e.g., drive, under the control of an autonomy system. That is, when autonomous vehicle 101 is in an autonomous mode, autonomous vehicle 101 is able to generally operate without a driver or a remote operator controlling autonomous vehicle. In one embodiment, autonomous vehicle 101 may operate in a semi-autonomous mode or a fully autonomous mode. When autonomous vehicle 101 operates in a semi-autonomous mode, autonomous vehicle 101 may operate autonomously at times and may operate under the control of a driver or a remote operator at other times. When autonomous vehicle 101 operates in a fully autonomous mode, autonomous vehicle 101 typically operates substantially only under the control of an autonomy system.

Allowing compartments 102 of vehicle 101 to be accessed by a user or a customer substantially without the user having to physically touch vehicle 101 allows the user to interact with vehicle 101 while reducing the likelihood that the user is exposed to a contaminant present on a surface of vehicle 101. For instance, if a user may gain access to compartments 102 of vehicle 101 without having to touch a human machine interface (HMI) such as a keypad on vehicle 101, the user may be substantially protected from contaminants such as germs that may be present on the surface of the HMI. As such, the chances that the user may contract an infection or a disease from the germs on the HMI are not increased as a result of the user touching the HMI. Further, the spread of infection or disease may be reduced. In addition, the ability for a user to access compartments 102 in a contactless manner may provide greater convenience in terms of interacting with vehicle 101, may enhance security, and/or may enable an HMI to be substantially removed from vehicle 101 or otherwise inactivated. Additionally, the ability to gain access to compartments 102 substantially without a user having to physically touch vehicle 101 provides accessibility to compartments 102 for users who may otherwise be unable to access compartments 102, e.g., for users with disabilities.

A user may generally interact in a contactless manner with vehicle 101 using a wide variety of methods. Methods for interacting in a contactless manner may include, but are not limited to including, interacting through the use of a cell phone or other device in the possession of the user, a mobile device with access to the internet, interacting through the use of a sensor, and/or interacting through the use of a scanning device. Sensors may include, but are not limited to including, cameras, motion detectors, RFID readers, heat sensors, and the like. Scanning devices may include, but are not limited to including, body scanners, thermal imaging scanners, biometric scanners, barcode scanners, QR code scanners, contactless fingerprint scanners, iris scanners, and the like.

In general, vehicle 101 may be commanded to execute an operation in response to a contactless interaction between vehicle 101 and a customer or a user. For example, a customer may make a gesture or a movement that is sensed by vehicle 101 and effectively signals that vehicle 101 is to execute an operation. A particular gesture or movement may effectively signal a request to open a door on a compartment of vehicle 101 or otherwise open a compartment of vehicle 101. In some embodiments, the contactless interaction between vehicle 101 and a customer may be authenticated in that the customer may be identified as having authority to command vehicle 101, prior to vehicle 101 executing the command associated with the contactless interaction. A single action may, in some cases, be arranged to both authenticate the customer and cause vehicle 101 to execute a command upon authenticating the customer. In general, an authentication indicator or metric that is provided by a customer for authentication processes may be a physical action, e.g., a gesture or a movement, a password, and/or substantially any other action which may allow the customer to be identified as having the authority to command vehicle 101.

Figure 4A:
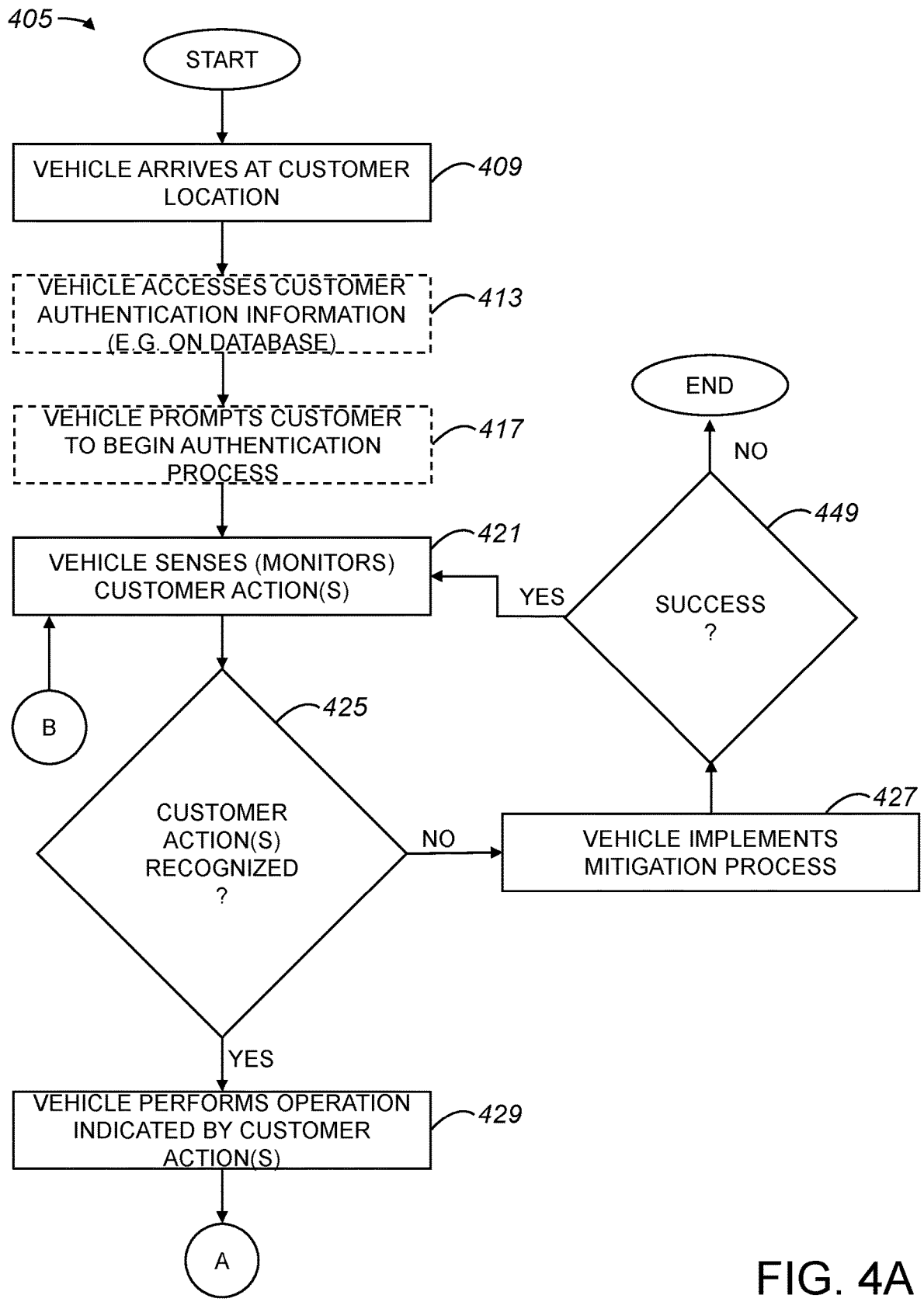
FIGS. 4A and 4B are a process flow diagram which illustrates a method of a user interacting with a vehicle in a contactless manner in accordance with an embodiment.
Figure 4B:
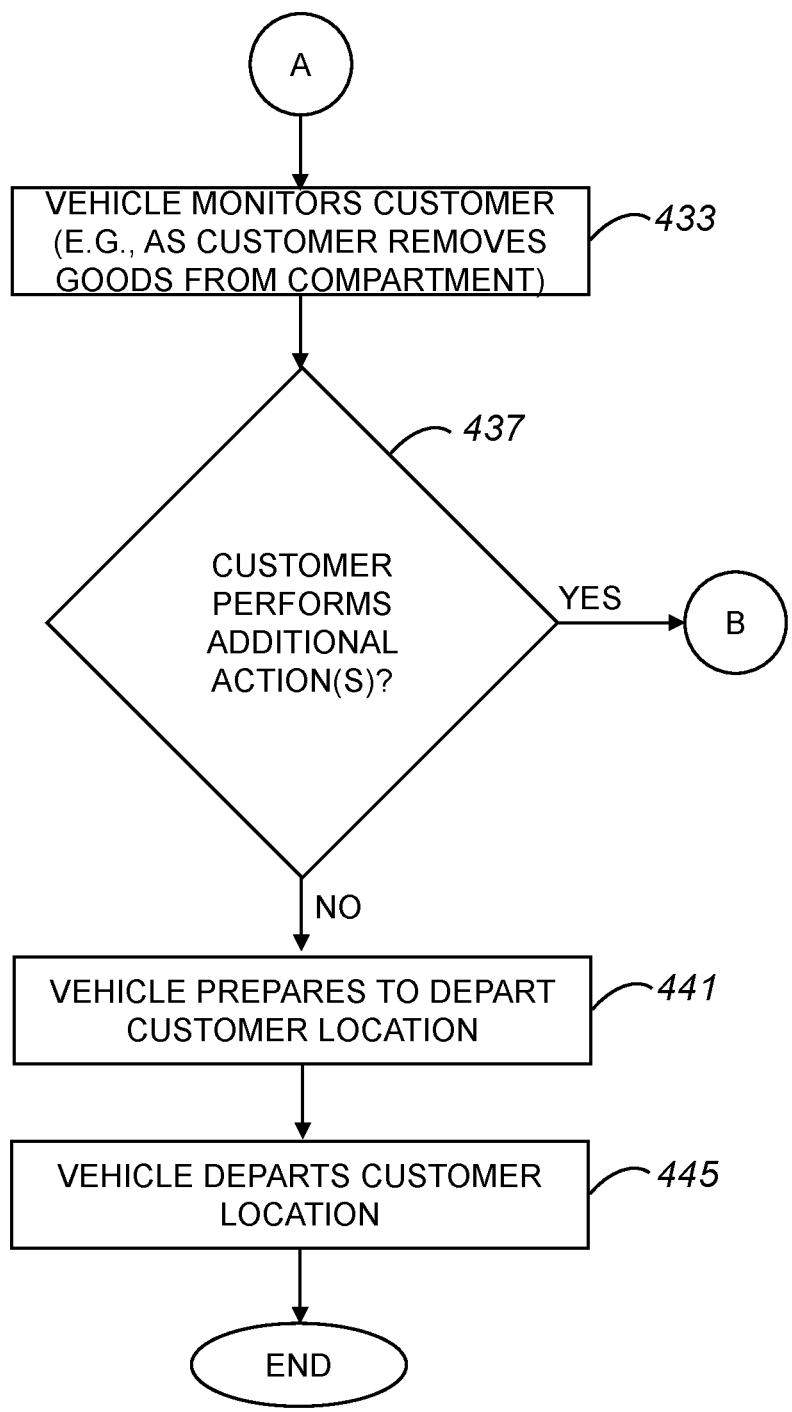

With reference to FIGS. 4A and 4B, a method of a user or a customer interacting with a vehicle in a substantially contactless manner will be described in accordance with an embodiment. A method 405 of a customer interacting with a vehicle, e.g., an autonomous vehicle such as autonomous vehicle 101 as discussed above, begins at a step 409 in which a vehicle arrives at a customer location. The vehicle may generally arrive at the customer location to deliver goods to the customer, or to pick up goods from the customer.

Once the vehicle arrives at a customer location, the customer may be notified of the arrival of the vehicle, and the vehicle may access authentication information associated with the customer in an optional step 413. By way of example, the vehicle may access information stored on a remote database or onboard the vehicle which will allow the customer to be authenticated or otherwise verified as being associated with the customer location. In one embodiment, the authentication information may include, but is not limited to including, information which substantially specifies at least one to be taken by the customer to effectively prove that he or she is entitled or otherwise allowed to access a compartment on the vehicle. The customer taking an action may involve the customer providing an authentication indicator.

In an optional step 417, the vehicle may prompt the customer to begin an authentication process. In other words, the vehicle may prompt the customer to perform at least one action intended to authenticate the customer such that the vehicle may perform an operation or take an action desired by the user, e.g., grant or provide access to a compartment of the vehicle for the user.

From step 409, or from optional step 413 and/or optional step 417, as appropriate, process flow moves to a step 421 in which the vehicle senses or monitors at least one action taken by the customer. The vehicle may effectively determine that the customer is taking at least one action, e.g., making a gesture or a move, intended to cause the vehicle to perform an operation. Any suitable device on the vehicle may sense or monitor actions taken by the customer. Suitable devices may include, but are not limited to including, sensors and/or scanner. For example, a camera may be used to obtain images of the actions taken by the customer, and a computing system onboard the vehicle or in communication with the vehicle may effectively identify the actions.

A determination is made in a step 425 in which it is determined whether the actions of the customer are recognized. That is, it is determined whether the actions of the customer, as sensed by the vehicle, are recognized as being actions which indicate a request or command that the vehicle perform a particular operation. A comparison of the actions of the customer may be compared to actions which are effectively arranged to cause particular actions to be taken by the vehicle. Such comparisons may be made using any suitable algorithms including, but not limited to including, machine learning algorithms. In general, image and pattern recognition algorithms may be executed, as for example by a computing device onboard the vehicle and/or by a computing device associated with a fleet management system, on data provided by a sensor such as a camera in order to identify the actions. It should be appreciated that the actions may be any suitable movement or set of movements, e.g., actions may include particular gestures. Actions may also include speech or voice commands provided by a user either in addition to or in lieu of movements, and such commands may be identified using speech or voice recognition algorithms.

In one embodiment, the action or actions arranged to effectively request that the vehicle perform a particular operation may be substantially universal. That is, actions which indicate an instruction may be substantially the same for all customers. In another embodiment, the action or actions arranged to effectively request that the vehicle perform a particular operation may be specific to a particular customer, specific to a particular set of customers, or specific to a particular location. Defining actions which indicate particular operations to be performed may be accomplished by any suitable party including, but not limited to including, a fleet management system, an enterprise from which goods to be delivered are obtained, and/or a customer. In another embodiment, actions may be associated with law enforcement. By way of example, when a siren is detected particular operations such as pulling over a moving vehicle or contacting a fleet management system may be performed.

If the determination in step 425 is that the actions of the customer are recognized, then in a step 429, the vehicle performs the operation indicated by the actions of the customer. For example, the vehicle may provide access to a compartment by opening a door to the compartment when the actions of the customer indicate a request to open the door, the vehicle may move its location when the actions of the customer indicate a request for the vehicle to propel itself, the vehicle may remain in place for a particular amount of time when the actions of the customer indicate a request for the vehicle to delay its departure, the vehicle may turn on lights when the actions of the customer indicate a request to turn on lights, the vehicle may change colors of lights when the actions of the customer indicate a request to change the colors of the lights, the vehicle may take a photo of the customer when the actions of the customer indicate a request to take a photo, and/or the vehicle may close and lock a door to the compartment when the actions of the customer indicate a request to close the door. In addition, the vehicle may also initiate a phone or video call to customer support or another support system, the vehicle may provide access to information such as a customer order from a remote database, the vehicle may play audio such as a song or other musical composition, and/or the vehicle may change the display on an HMI. Further, the vehicle may provide feedback to the customer that his or her command has been received and/or transmit other information to the customer.

Once the vehicle performs the operation indicated by the actions of the customer, the vehicle effectively monitors the customer in a step 433. Monitoring the customer may include, but is not limited to including determining when the customer removes goods carried in a compartment of the vehicle when the actions of the customer indicated a request to open a door to the compartment, and/or determining when the customer indicates that the vehicle has successfully completed a requested operation.

In a step 437, a determination is made as to whether the customer performs additional actions. That is, as the vehicle monitors the customer, e.g., using a camera or other suitable sensor, to determine whether the customer appears to be performing an action or actions which indicate another request or command. If the determination is that customer is performing additional actions which are a request or command for the vehicle to perform a particular operation, process flow returns to step 421 in which the vehicle senses at least one action of the customer.

Alternatively, it the determination in step 437 is that the customer is not performing additional actions, then the implication is that the customer has completed his or her transaction with, or is otherwise finished with, the vehicle. Accordingly, process flow moves to a step 441 in which the vehicle prepares to depart from the customer location. In one embodiment, the vehicle may determine whether a door to a compartment is open, and may close the compartment door. Preparing to depart from the customer location may also include, but is not limited to including, identifying a next location to which the vehicle will travel. In a step 445, the vehicle departs the customer location, and the method of a user interacting with a vehicle is completed.

Returning to step 425 and the determination of whether customer actions are recognized, if the determination is that the customer actions are not recognized, the implication may be that either the customer does not remember the actions intended to indicate a particular operation to be performed, or that the purported customer is a fraud. As such, process flow moves to a step 427 in which the vehicle implements a mitigation process. The mitigation process may include, but is not limited to including, the vehicle contacting a fleet management system to authenticate the customer, the vehicle contacting the customer through a wireless network to authenticate the customer, the vehicle providing an indication of the inability to authenticate the customer on an HMI on the vehicle, and/or the vehicle notifying the customer through a wireless network that the vehicle is unable to serve the customer. In one embodiment, a mitigation process may include determining if certain criteria are met, e.g., if a particular amount of time has elapsed. Once the vehicle implements the mitigation process, process flow proceeds to a step 449 in which it is determined whether the mitigation process was successful. If the mitigation process was successful, process flow returns to step 421 in which the vehicle senses one or more customer actions. Alternatively, if the determination in step 449 is that the mitigation process was not successful, the method of a user interacting with a vehicle is completed.

Actions taken or otherwise performed by a customer to request or to command a vehicle to perform an operation may include, but are not limited to including, making at least one gesture, e.g., a hand gesture, and/or moving, e.g., moving his or her entire body or a part of the body. Gestures and other movement may be detected by any suitable sensor carried on the vehicle. Other actions taken or otherwise performed by a customer may include, but are not limited to including, actions monitored by a camera, actions made using an RFID reader may be used to scan an ID card or badge in the possession of customer, actions monitored using NFC technology, actions monitored by a microphone, actions monitored by a cloud-based system, actions monitored through the use of Bluetooth technology, actions monitored by neurological sensors, and/or actions which involve the customer sending a text or SMS message.

While a single gesture or a single movement by a customer may command a vehicle to perform an operation, the use of more than one gesture or more than one movement by a customer to command a vehicle may reduce the likelihood that the vehicle accidentally interprets a gesture or a movement as being a command. For example, when a single gesture is arranged to cause a compartment door of a vehicle to close, a customer who accidentally makes the single gesture may inadvertently cause the door to close before he or she intends for the door to close. A customer may be less likely to accidentally make more than one gesture, e.g., a series of gestures, that may command a vehicle to perform an operation.

Figure 5:
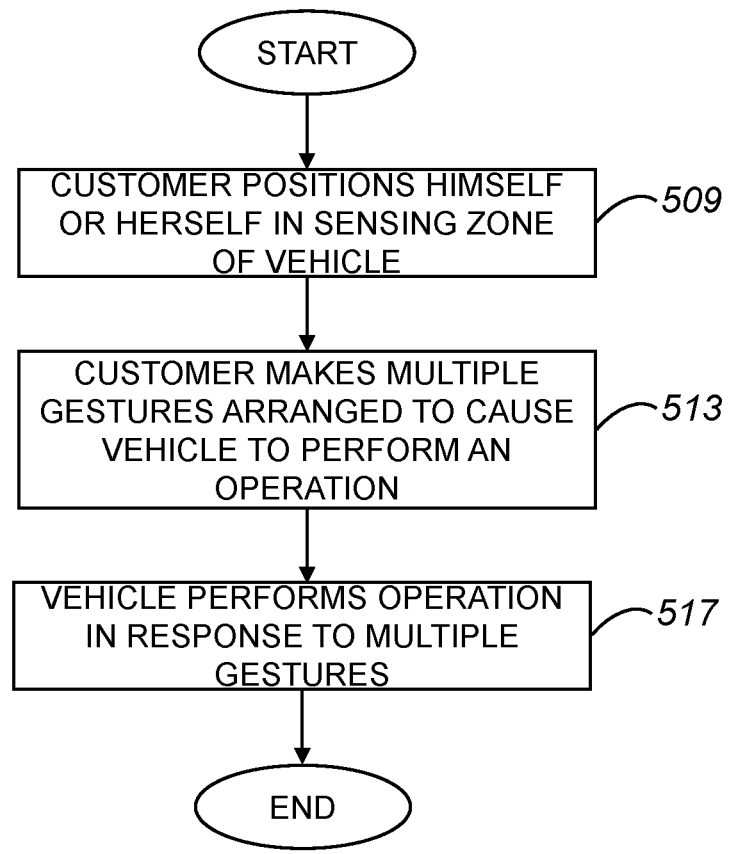
FIG. 5 is a process flow diagram which illustrates a method of performing at least one gesture to cause a vehicle to execute or to otherwise perform an operation in accordance with an embodiment.

FIG. 5 is a process flow diagram which illustrates a method of performing at least one gesture to cause a vehicle to execute or to otherwise perform an operation in accordance with an embodiment. A method 505 of performing at least one gesture to command a vehicle to perform an operation begins at a step 509 in which a customer positions himself or herself in a sensing zone of a vehicle, e.g., an autonomous vehicle such as vehicle 101 of FIG. 2. A sensing zone of a vehicle may be a zone or area in the vicinity of the vehicle within which a sensor on the vehicle may be able to identify when the customer is performing gestures. The sensing zone may be, but is not limited to being, associated with a distance from a camera at which the camera may be used to discern when a customer is making gestures or associated with a distance from a motion sensor at which the motion sensor may detect when a customer is making gestures. It should be appreciated that the size of the sensing zone may vary widely. For example, a sensing zone associated with a camera may be larger than a sensing zone associated with a motion sensor. In one embodiment, a sensing zone for a microphone may be defined as being within approximately ten meters of the microphone, while a sensing zone for a camera may be defined as being within approximately twenty meters of the camera. In another embodiment, when an RFID sensor is used, a sensing zone may vary depending upon the standard adopted, and when a sensor is an ultra-wideband (UWB) sensor, a sensing zone may be defined as being within approximately two hundred meters of the UWB sensor. It should be understood that, in general, a sensing zone may correspond to a substantially maximum sensing range of a sensor that is performing the sensing.

After the customer positions himself or herself in a sensing zone of a vehicle, the customer may make multiple gestures or motions arranged to cause the vehicle to perform an operation in a step 513. The multiple gestures may be performed in parallel or in series. That is, the multiple gestures may be made at substantially the same time or sequentially. Gestures made in parallel may be made by a customer, for example, using both arms and/or hands. Gestures may also be made using feet and/or legs.

In response to the multiple gestures, the vehicle performs an operation in step 517. Once the vehicle performs the operation, the method of performing at least one gesture to command a vehicle to perform an operation is completed.

Figure 6:
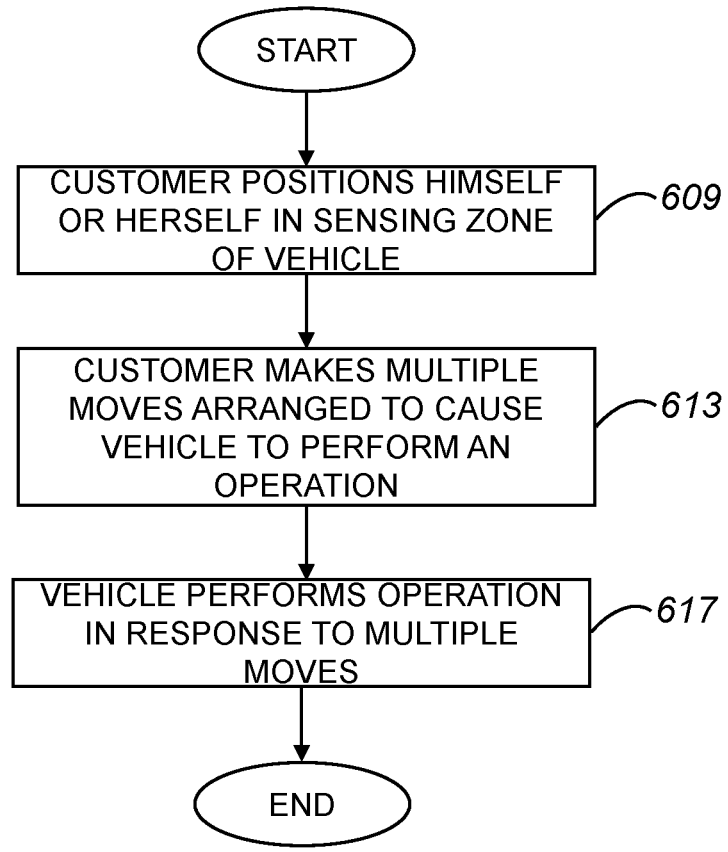
FIG. 6 is a process flow diagram which illustrates a method of making at least one movement to cause a vehicle to execute or to otherwise perform an operation in accordance with an embodiment.

FIG. 6 is a process flow diagram which illustrates a method of making at least one movement to cause a vehicle to execute or to otherwise perform an operation in accordance with an embodiment. A method 605 of performing at least one movement or motion to command a vehicle to perform an operation begins at a step 609 in which a customer positions himself or herself in a sensing zone of a vehicle, e.g., an autonomous vehicle such as vehicle 101 of FIG. 2. A sensing zone of a vehicle may be a zone or area in the vicinity of the vehicle within which a sensor on the vehicle may be able to identify when the customer is performing movements.

After the customer positions himself or herself in a sensing zone of a vehicle, the customer may make multiple movements arranged to cause the vehicle to perform an operation in a step 513. The multiple movements may be performed in parallel or in series. That is, the multiple movements may be made at substantially the same time or sequentially. The movements may include, but are not limited to including, any movements that a person may make. Movements include, but are not limited to including, body movements, head movements, eye movements, leg movements, arm movements, etc.

In response to the multiple movements, the vehicle performs an operation in step 617. Once the vehicle performs the operation, the method of performing at least one movement to command a vehicle to perform an operation is completed.

The gestures or movements that may effectively define a command to a vehicle may vary widely. For example, a single gesture such as a thumbs up gesture performed in view of a camera on a vehicle may effectively define a command to open a compartment of the vehicle. Alternatively, a series of movements performed in view of a camera on a vehicle may instead define a command to open a compartment of the vehicle. In other words, movements or gestures used to define a command may be customizable. In one embodiment, gestures or movements may generally be understood to represent a particular command, e.g., a particular series of gestures or movements may be substantially known to represent a command to provide access to a compartment. In another embodiment, gestures or movements may be specific to a customer, to a group, and/or to a location. That is, gestures or movements which represent specific commands may vary, and may be determined by a customer, a group, and/or a location. It should be appreciated that in some instances, authentication may be performed based on the presence of a customer at a particular location, e.g., the physical presence of the customer at the particular location may be considered to be a gesture. In some instances, gestures may include facial gestures or movements, e.g., smiles or mouthed words.

When gestures or movements that effectively define a command may be set by a customer, a group, and/or a location, the security associated with the gestures or movements may be enhanced. By way of example, if a customer defines a particular, unique sequence of gestures to be his or her command to open a compartment door of a vehicle, the likelihood that another party may cause the compartment door to be opened is substantially reduced as the other party may be unlikely to know the unique sequence of gestures. The customer may generally define unique sequences of gestures that he or she will substantially always use to command a vehicle to perform an operation, or the customer may define unique sequences each time he or she expects to interact with a vehicle.

Figure 7:
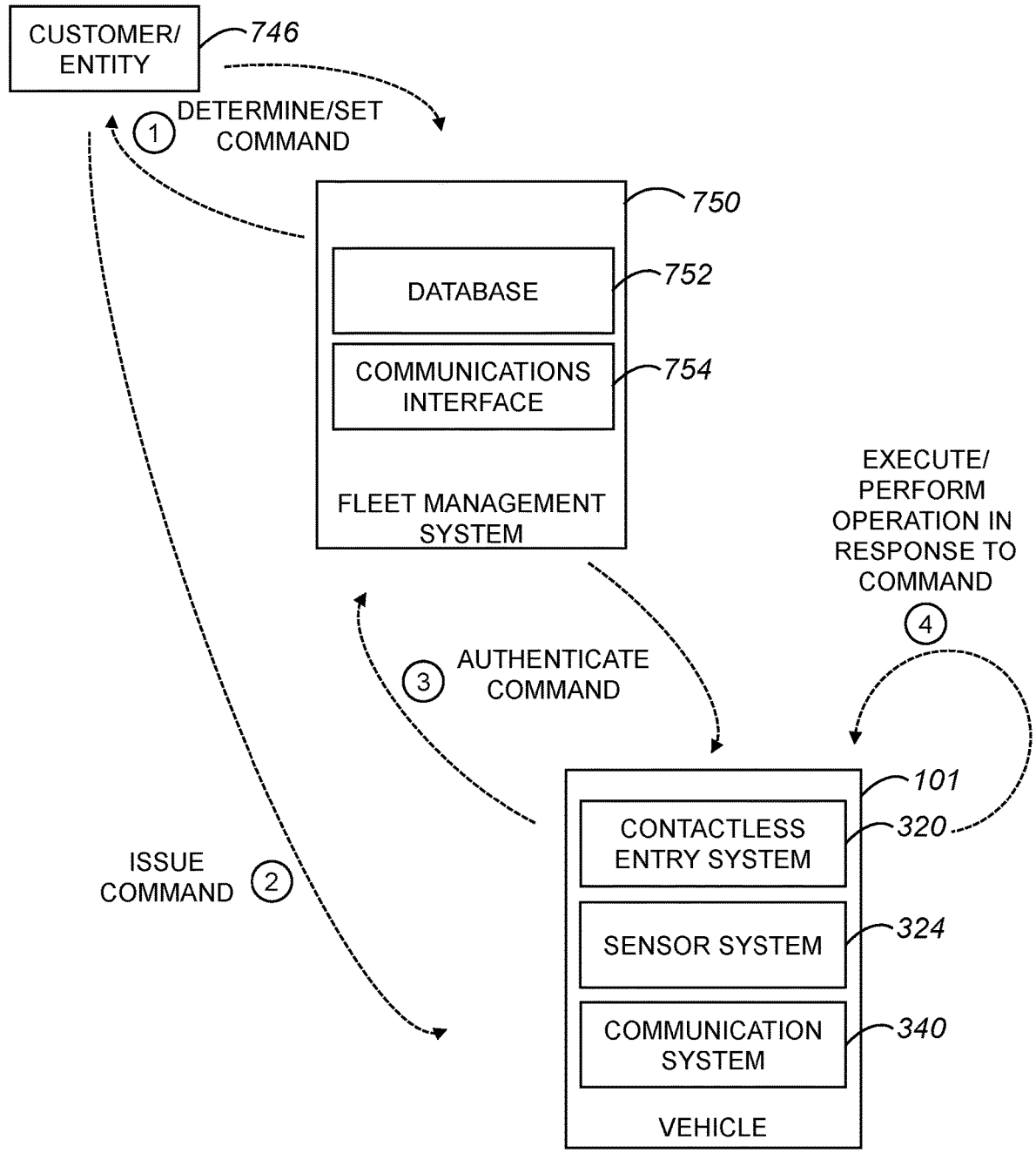
FIG. 7 is a diagrammatic representation of a process of selecting or otherwise identifying a command to be used to cause a vehicle to perform an operation in accordance with an embodiment.

Referring next to FIG. 7, a process of selecting or otherwise identifying a command to be used to cause a vehicle to perform an operation will be described in accordance with an embodiment. A customer or an entity 746, which may represent an individual or a group of individuals, may access a system 750, which may be a fleet management system, to determine or otherwise set a command. The command may include, but is not limited to including, at least one gesture, at least one movement, at least one password, and/or at least one identifying characteristic which may be used to indicate an operation to be performed by vehicle 101. That is, the command may be an action and/or an identifier which is arranged to indicate that customer 746 is requesting that vehicle 101 perform an operation and, in some instances, to indicate that customer 746 is authorized or authenticated to request the operation. It should be appreciated that an identifying characteristic may be associated with an item in the possession of customer 746 such as a printed QR code, a printed bar code, and/or a printed receipt. In general, customer 746, system 750, and vehicle 101 are part of a platform which enables vehicle 101 to be commanded by customer 746 and/or system 750.

Fleet management system 750 may be associated with an enterprise which dispatches vehicle 101 and/or manages a fleet of vehicles that includes vehicle 101. In one embodiment, fleet management system 750 may be associated with a retailer that delivers or otherwise dispatches goods using vehicle 101. Fleet management system 750 may generally store information relating to customer 746 in a database 752, and may communicate with customer 746 and/or with vehicle 101 using a communications interface 754. Communications interface 754 may be arranged to support communications, e.g., wireless network communications, such as cellular communications, 3G/4G/5G communications, Bluetooth communications, and/or Wi-Fi communications. In one embodiment, fleet management system 750 may be associated with a cloud server.

When customer 746 interacts with fleet management system 750, customer 746 may obtain information relating to at least one command from fleet management system 750. For example, fleet management system 750 may store information relating to commands in database 752, and may retrieve information from database 752 to provide to customer 746. Information may be provided using any suitable method including, but not limited to including, providing information on a website, providing information through an application, providing information via an email, providing information via a text or a chat message, and/or providing information via a printout.

In one embodiment, when customer 746 communicates with fleet management system 750, customer 746 may either set a command or may select a command. When customer 746 sets a command, customer 746 effectively defines a command. For example, when a command includes at least one gesture, customer 746 may indicate which gesture or gestures are to be made by customer 746 to command vehicle 101 to execute or to otherwise perform a particular operation. Customer 756 may set the command by providing or uploading a video, a photo, an audio recording, and/or a text file to database 752. When customer 746 selects a command, customer 746 may be presented with possible commands via database 752, and may interact with fleet management system 750 to essentially select at least one command. By way of example, if customer 746 is provided with a selection of gesture sequences which may be used to cause a compartment door of vehicle 101 to open, customer 746 may select the gesture sequence customer 746 wishes to use to cause the compartment door of vehicle 101 to open.

Once at least one command is defined or identified by customer 746 in cooperation with fleet management system 750, customer 746 may subsequently issue a command to vehicle 101. Issuing a command may include, but is not limited to including, customer 746 making gestures, making movements, and/or otherwise providing a password that is sensed by sensor system 324 of vehicle 101. Vehicle 101 may communicate with fleet management system 750 using communication system 340 to determine whether the command issued by customer 746 is authenticated, i.e., whether vehicle 101 may execute an operation associated with the command. For example, if customer 746 makes at least one gesture, vehicle 101 communicates with fleet management system 750 to determine if there is an operation associated with the gesture and/or whether customer 746 may be authenticated based on the gesture or otherwise has the authority to issue the command.

If the command is authenticated, then vehicle 101 may execute or otherwise perform the operation associated with the command. That is, if the command is authenticated, vehicle 101 responds to the command. By way of example, if the command is a request to open a compartment door on vehicle 101, vehicle 101 may open the compartment door.

In order to reduce the likelihood that a vehicle such as an autonomous vehicle is accessed or commanded in a fraudulent manner, e.g., by someone who does not have rightful access to a compartment on the vehicle, a multi-factor authentication process such as a two-factor authentication process may be implemented. As will be appreciated by those skilled in the art, multi-factor authentication is a method of authentication in which more than one factor is used to authenticate or verify a customer or a user before the customer or the user is granted permission or access to something, e.g., a compartment of a vehicle. The multiple factors may include, but is not limited to including, providing multiple pieces of knowledge or evidence which effectively identify a customer or a user.

In a multi-factor authentication process, the different factors may substantially all be set by a fleet management system or an enterprise associated with the fleet management system. Alternatively, the different factors may substantially all be set by a customer. Factors may also be set by a combination of a fleet management system and a customer, e.g., a fleet management system may set one factor and a customer may set another factor.

Figure 8:
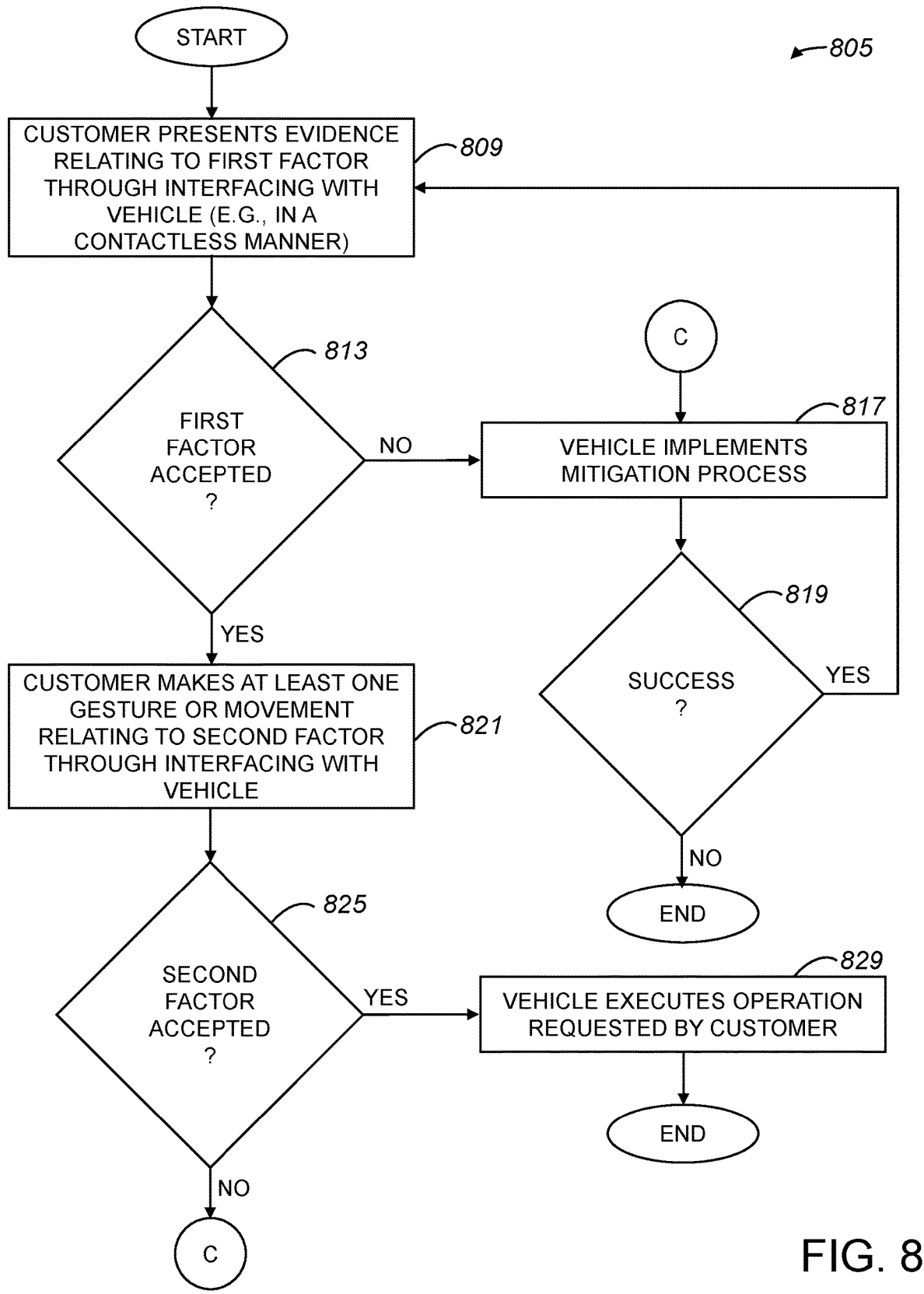
FIG. 8 is a process flow diagram which illustrates a method of performing two-factor authentication that includes utilizing gestures and/or movements in accordance with an embodiment.

In one embodiment, multi-factor authentication may include a factor that involves at least one gesture or movement. That is, at least one gesture or movement that is known substantially only to a user or to a limited group associated with the user may be one factor in a multi-factor authentication process. Such a gesture may be associated with any factor in a multi-factor authentication process, e.g., a gesture may be associated with a first factor or a second factor. FIG. 8 is a process flow diagram which illustrates a method of performing two-factor authentication or, more generally, multi-factor authentication, in which at least one factor includes the use of gestures and/or movements in accordance with an embodiment. A method 805 of performing a two-factor authentication process begins at a step 809 in which a customer presents evidence relating to a first factor of a two-factor authentication process through interface with a vehicle. In general, the customer may be present in a sensing zone associated with the vehicle, and may present evidence by interfacing with a sensor onboard the vehicle. In one embodiment, the customer may effectively provide the first factor in any suitable manner that does not necessitate the customer physically contacting the vehicle. Providing evidence relating to a first factor may include, but is not limited to including, the customer performing at least one gesture and/or movement, the customer submitting to facial recognition, the customer submitting to a touchless fingerprint scan, the customer submitting to an eyeball or iris scan, the customer scanning an identification card, the customer holding up an identification card to a camera, the customer scanning a QR code or a bar code, etc. It should be appreciated, however, that in some embodiments, a customer may touch a keypad or other user interface device on the vehicle in order to present evidence relating to a first factor. That is, evidence relating to a first factor may be presented in a contactless manner or in a manner that utilizes contact.

A determination is made in a step 813 as to whether the first factor is accepted. That is, it is determined if the vehicle, or the vehicle in cooperation with a fleet management system, has at least partially authenticated the customer based on the first factor. If the determination in step 813 is that the first factor is not accepted, the implication may be that the customer is either unauthorized or is otherwise unable to satisfactorily provide evidence relating to the first factor. Accordingly, process flow moves to a step 817 in which the vehicle implements a mitigation process. The mitigation process may be any suitable process which effectively attempts to resolve an inability for the customer to be authenticated using two-factor authentication. The mitigation process may include, but is not limited to including, having the customer communicate with a customer service representative associated with a fleet management system, requesting that the customer provide information that allows for authentication to be accomplished another way, etc.

Once the vehicle implements the mitigation process, a determination is made in a step 819 as to whether the mitigation process is successful. That is, it is determined if the mitigation process has effectively addressed an issue which caused the first factor not to be accepted. If the determination in step 819 is that the mitigation process is successful, process flow returns to step 809 in which the customer presents evidence relating to the first factor. Alternatively, if the determination in step 819 is that the mitigation is not successful, the method of performing two-factor authentication may be completed.

Alternatively, if the determination in step 813 is that the first factor is accepted, then in a step 821, the customer provides evidence relating to a second factor through interface with the vehicle. In the described embodiment, the customer makes at least one gesture or movement relating to the second factor through interfacing with the vehicle, e.g., in a contactless manner. In one embodiment, the first factor and the second factor may be provided in substantially any order.

A determination is made in a step 825 as to whether the second factor is accepted. That is, it is determined whether the customer has correctly or accurately made the correct gestures and/or movements to satisfy the two-factor authentication process. If it is determined that the second factor is accepted, the vehicle executes the operation requested by the customer in a step 829, and the method of performing two-factor authentication is completed. If, on the other hand, the determination in step 825 is that the second factor is not accepted, then process flow moves from step 825 to step 817 in which the vehicle implements a mitigation process.

In general, gestures or movements used to effectively specify a request or a command to a vehicle such as an autonomous vehicle may include gestures which effectively spell out or otherwise specify a password. For example, gestures may include clapping or tapping out Morse code. The Morse code may be sensed using an audio sensor such as a microphone, or may effectively be sensed using a camera or a motion sensor. Gestures may also include sign language that may effectively be sensed by a camera. The Morse code and/or sign language may, in one embodiment, spell out a password which may be analyzed to determine if the password matches a password known to authorize a vehicle to execute an operation.

How a customer chooses to interact with a vehicle may depend, at least in part, upon the comfort level of the customer with regards to the environment he or she is in. For example, when the customer interacts with the vehicle in a safe locale, the customer may be comfortable verbally speaking a password or openly making a gesture to command the vehicle to perform an operation. Alternatively, when the customer interacts with the vehicle in a location that is not considered to be secure, the customer may wish to be more circumspect with respect to how he or she commands the vehicle to perform an operation. The customer may, in one embodiment, command to the vehicle to depart and return to the customer at a later time.

Figure 9:
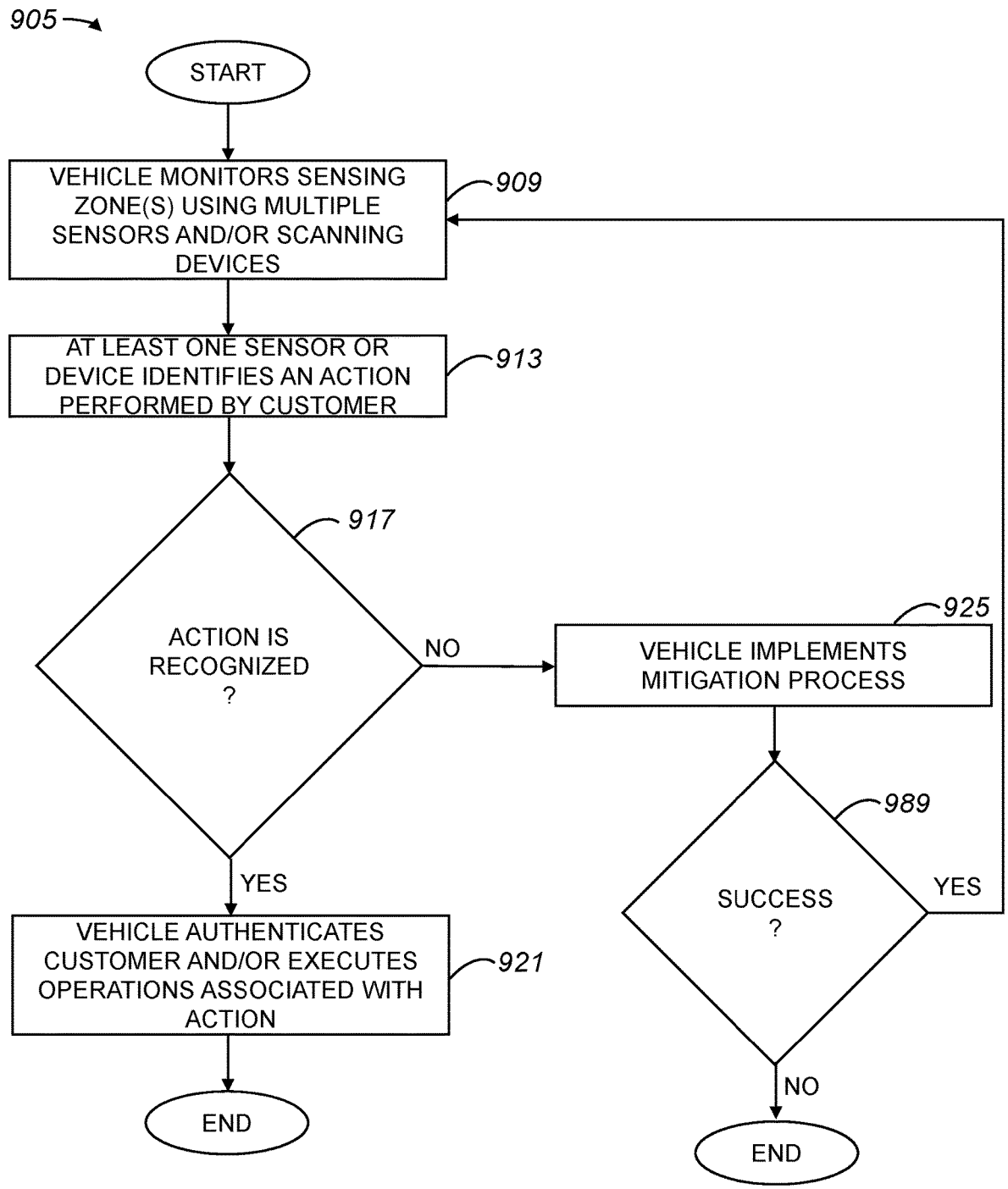
FIG. 9 is a process flow diagram which illustrates a method of interpreting an action to authenticate a customer or to command a vehicle in accordance with an embodiment.

To support multiple methods of authenticating a customer and/or multiple methods of allowing the customer to command a vehicle, a vehicle may be arranged to use any and/or all of a suite of onboard sensors to sense when the customer is performing an action, e.g., an action to command the vehicle to execute an operation. That is, a vehicle may use multiple onboard sensors to monitor a customer to determine when a customer performs an action. Referring next to FIG. 9, a method of interpreting an action to authenticate a customer or to command a vehicle will be described in accordance with an embodiment. A method 905 of interpreting an action by a customer begins at a step 909 in which a vehicle, e.g., vehicle 101 of FIGS. 2 and 3, monitors at least one sensing zone using multiple sensors and/or scanning devices that are onboard the vehicle. In one embodiment, an HMI such as a keypad on the vehicle is also active and able to receive input.

In a step 913, at least one sensor or device on the vehicle identifies an action performed by the customer. The action may be any suitable action sensed or otherwise identified by a sensor or a device. For example, a camera may sense that the customer is performing at least one gesture, performing at least one move, substantially spelling out a password in Morse code, substantially spelling out a password using sign language, holding a paper or a display screen which identifies a password or an identification code such as an order number, holding a paper or a display screen which includes a barcode or a QR code, posing to enable facial recognition to occur, etc. A microphone or audio sensor may sense that the customer is tapping out password using Morse code, reciting a password, and/or reciting an identification code. A keypad may sense that the customer is typing in a password and/or an identification code. A scanner may sense that the customer is scanning an identification card, a bar code, and/or a QR code. An iris scanner may sense that the customer is presenting one of his or her irises for scanning. A fingerprint scanner may sense that the customer is providing his or her fingerprints. A computing device may sense that the customer has sent a text or other communication to the vehicle and/or a fleet management system.

From step 913, process flow moves to a step 917 in which it is determined whether the action is recognized. If the determination is that the action is recognized, the indication is that the action is suitable for authenticating the customer and/or for allowing the customer to command the vehicle to execute an operation. As such, in a step 921, the vehicle may authenticate the customer and/or may execute at least one operation associated with the action. The method of interpreting an action by a customer is then completed.

Alternatively, if the determination in step 917 is that the action is not recognized, the vehicle may implement a mitigation process in a step 925. The mitigation process may generally allow the vehicle, in cooperation with a fleet management system in some embodiments, to determine how to address issues with the customer. In one embodiment, a mitigation process may include, but is not limited to including, prompting the customer to perform a different action that may be sensed by a different sensor or device and/or putting the customer in contact with a customer service representative associated with a fleet management system.

Once the vehicle implements the mitigation process, a determination is made in a step 929 as to whether the mitigation process is successful. That is, it is determined if the mitigation process has effectively addressed an issue which caused the action performed in step 917 not to be recognized. If the determination in step 929 is that the mitigation process is successful, process flow returns to step 909 in which the vehicle monitors the sensing zone. Alternatively, if the determination in step 929 is that the mitigation is not successful, the method of interpreting an action by a customer may be completed.

To increase the likelihood that a customer who issues a command to a vehicle is substantially authorized or otherwise allowed to command the vehicle, the customer may be provided with an action to perform when the vehicle is in proximity to the customer or when the vehicle is a predetermined amount of time away from being ready to be commanded by the customer. By way of example, a customer may receive an instruction in text message or other notification when the customer is positioned near a vehicle or when the vehicle is almost ready to be commanded. Such a text message may specify at least one gesture or at least one movement the customer is to make if he or she is to command the vehicle. For instance, when a customer is within a sensing zone of the vehicle, the customer may receive a text message which specifies at least one gesture for the customer to make in order to be granted access to a compartment of the vehicle. When a customer is within relatively close proximity to a vehicle when he or she effectively receives instructions on how to command the vehicle, the instructions are less likely to be intercepted and used by an unauthorized party. In one embodiment, the customer may be provided with a CAPTCHA, or a challenge arranged to identify human input. to complete on a device in his or her possession when the customer is in relatively close physical proximity to the vehicle and/or when the vehicle is almost ready to be commanded.

Figure 10:
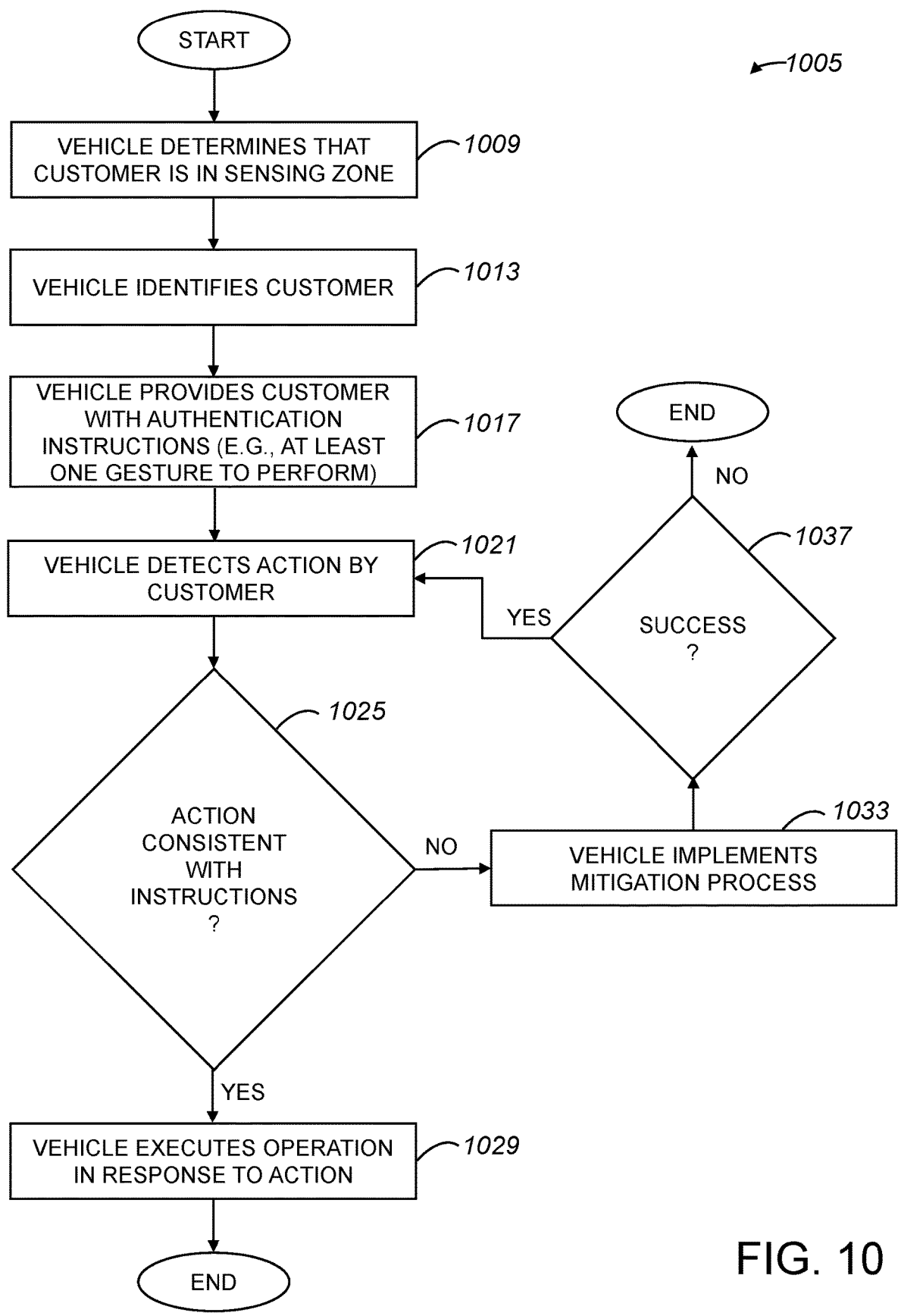
FIG. 10 is a process flow diagram which illustrates a method of a vehicle interacting with a customer to enable the customer to command a vehicle in accordance with an embodiment.

FIG. 10 is a process flow diagram which illustrates a method of a vehicle interacting with a customer to provide instructions on how to enable the customer to command a vehicle in accordance with an embodiment. A method 1005 of a vehicle interacting with a customer begins at a step 1009 in which the vehicle determines that a customer, or a potential customer, is in a sensing zone of the vehicle. The vehicle, which may be an autonomous delivery vehicle such as vehicle 101 of FIGS. 2 and 3, may use any suitable sensors to determine that the customer is in the sensing zone. For example, a camera may ascertain that a customer is present in the sensing zone. It should be appreciated that the presence of a customer in a sensing zone of the vehicle is a preferred embodiment.

In a step 1013 the vehicle identifies the customer. Identifying the customer may include, but is not limited to including, performing facial recognition on the customer using a camera and image processing algorithms, identifying and verifying at least one gesture or movement made by the customer, and/or otherwise obtaining identifying information from the customer using at least one sensor or device onboard the vehicle.

After the vehicle identifies the customer, the vehicle provides the customer with authentication instructions in a step 1017. The authentication instructions may be provided either directly from the vehicle to the customer or indirectly from the vehicle to the customer, e.g., through a fleet management system. The authentication instructions may generally be instructions which may be used by the customer to substantially authenticate himself or herself, and/or to command the vehicle. The authentication instructions may be provided to the customer using any suitable method. Suitable methods may include, but are not limited to including, texting or otherwise sending instructions to a cell phone or other device in the possession of the customer, displaying instructions on a screen of the vehicle, providing instructions in an application that the customer has access to via a cell phone or other device in the possession of the customer, etc. In one embodiment, the instructions may instruct the customer to engage in a CAPTCHA using an application on his or her cell phone. In another embodiment, the instructions may provide text, a picture, and/or a video which depicts at least one gesture or movement to be made by the customer in order for the customer to authenticate himself or herself, and/or to command the vehicle.

In a step 1021, the vehicle detects an action by the customer. The action by the customer may be detected using any suitable sensor onboard the vehicle. From step 1021, process flow proceeds to a step 1025 in which it is determined whether the action detected by the vehicle is consistent with the instructions the vehicle provided to the customer. That is, it is determined in step 1025 whether the customer is acting in accordance with the instructions provided in step 1017.

If it is determined in step 1025 that the detected action is consistent with the instructions, then the vehicle executes an operation in response to the action in a step 1029. The vehicle may further interact with the customer by obtaining additional commands from the customer before executing an operation. For example, if the action is arranged to indicate that the customer has permission to issue commands to the vehicle, then the vehicle may obtain at least one additional command from the customer before executing an operation. Once the vehicle executes the operation in response to the action, the method of a vehicle interacting with a customer is completed.

Alternatively, if it is determined in step 1025 that the action is not consistent with the instructions, then the vehicle implements a mitigation process in a step 1033. Once the mitigation process is implemented, a determination is made in a step 1037 as to whether the mitigation process is successful. That is, it is determined if the mitigation process has effectively addressed an issue which caused the action to be substantially identified as being inconsistent with instructions in step 1025. If the determination in step 1037 is that the mitigation process is successful, process flow returns to step 1021 in which the vehicle detects at least one action by the customer. Alternatively, if the determination in step 1037 is that the mitigation is not successful, the method of a vehicle interacting with a customer is completed.

Multi-factor authentication, as discussed above with respect to FIG. 8, may include at least one factor that involves making at least one gesture or movement. Multi-factor authentication may be used, for example, for applications in which ensuring that a customer may be verified using stringent stands is tantamount. To further increase the security associated with a multi-factor authentication process, some authentication information to be used by a user during the authentication process may be provided to the user substantially while he or she is participating in the authentication process. For example, authentication information may be texted to a cell phone of the user for use as a second factor substantially only after the user has successfully provided information relating with a first factor.

Figure 11:
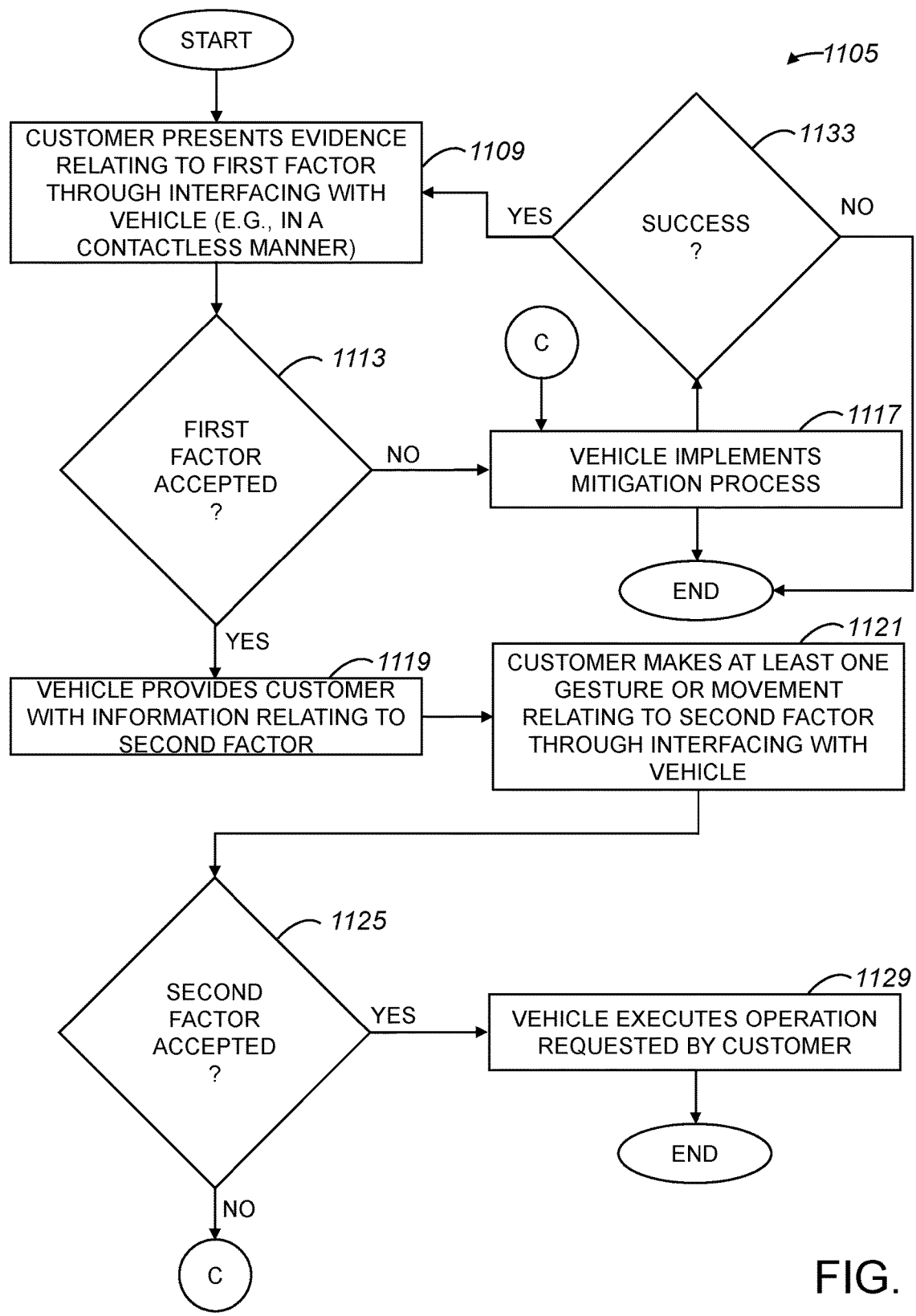
FIG. 11 is a process flow diagram which illustrates a method of performing two-factor authentication that includes utilizing gestures and/or movements provided after a first factor is accepted in accordance with an embodiment.

FIG. 11 is a process flow diagram which illustrates a method of performing multi-factor authentication, e.g., two-factor authentication, that includes utilizing gestures and/or movements provided after a first factor is accepted in accordance with an embodiment. A method 1105 of performing two-factor authentication begins at a step 1109 in which a customer presents evidence relating to a first factor of a two-factor authentication process through interface with a vehicle. In general, the customer may be positioned in a sensing zone associated with the vehicle, and may present evidence by interfacing with a sensor onboard the vehicle.

A determination is made in a step 1113 as to whether the first factor is accepted. That is, it is determined if the vehicle, or the vehicle in cooperation with a fleet management system, has at least partially authenticated the customer based on the first factor. If the determination in step 1113 is that the first factor is not accepted, the implication may be that the customer is either unauthorized or is otherwise unable to satisfactorily provide evidence relating to the first factor. Accordingly, process flow moves to a step 1117 in which the vehicle implements a mitigation process to attempt to resolve issues associated with authenticating or verifying the customer. Once the vehicle implements the mitigation process, process flow may optionally return to step 1109, or the method of performing two-factor authentication may be completed.

Alternatively, if the determination in step 1113 is that the first factor is accepted, then in a step 1119, the vehicle provides the customer with information relating to a second factor. That is, the vehicle either directly, or indirectly through a fleet management system, effectively provides the customer with a second factor. Providing the customer with a second factor, e.g., to a cell phone in the possession of the customer, during a two-factor authentication process may reduce the likelihood that an unauthorized party may gain the ability to issue a command to the vehicle. Generally, the information provided may include, but is not limited to including, text, a video, a photo, and/or an audio file which identifies an action the customer may take in order to complete the two-factor authentication. For example, the information provided may be a video or a photo which identifies at least one gesture or movement that the customer is to perform as a second factor.

After the customer makes a gesture or movement step 1121, the customer provides evidence relating to a second factor through interface with the vehicle. In the described embodiment, the customer makes at least one gesture or movement relating to the second factor through interfacing with the vehicle, e.g., in a contactless manner. The customer may make at least one gesture or movement in a sensing range of a sensor such as a camera onboard the vehicle.

From step 1121, process flow moves to a step 1125 in which it is determined whether the second factor is accepted. That is, it is determined whether the customer has correctly or accurately made the correct gestures and/or movements to satisfy the two-factor authentication process. If it is determined that the second factor is accepted, the vehicle executes the operation requested by the customer in a step 1129, and the method of performing two-factor authentication is completed.

Alternatively, if the determination in step 1125 is that the second factor is not accepted, then process flow moves from step 1125 to step 1117 in which the vehicle implements a mitigation process. Once the vehicle implements the mitigation process, a determination is made in a step 1133 as to whether the mitigation process is successful. That is, it is determined if the mitigation process has effectively addressed an issue which caused the first factor to not be accepted in step 1113. If the determination in step 1133 is that the mitigation process is successful, process flow returns to step 1109 in which the customer presents evidence relating to the first fact. Alternatively, if the determination in step 1133 is that the mitigation is not successful, the method of performing two-factor authentication is completed.

In one embodiment, one factor of authentication may involve a translation of a password or code from one mode into another mode. For example, an authentication code may be provided to a customer in one language, and the customer may be substantially required to translate the authentication code into another language for verification. By providing a factor of authentication in one mode or format, and having a customer translate the factor of authentication into another mode or format, the likelihood that an unauthorized user may illicitly access a compartment of a vehicle may be reduced. In general, a fleet management system may provide a visual command to a customer, e.g., a visual image of an object and/or a word shown in text. The customer may be expected to command a vehicle to perform a task by translating the visual command into another mode, e.g., audibly state what is shown in a visual image and/or speak a word shown in text, that may be detected and authenticated.

Figure 12:
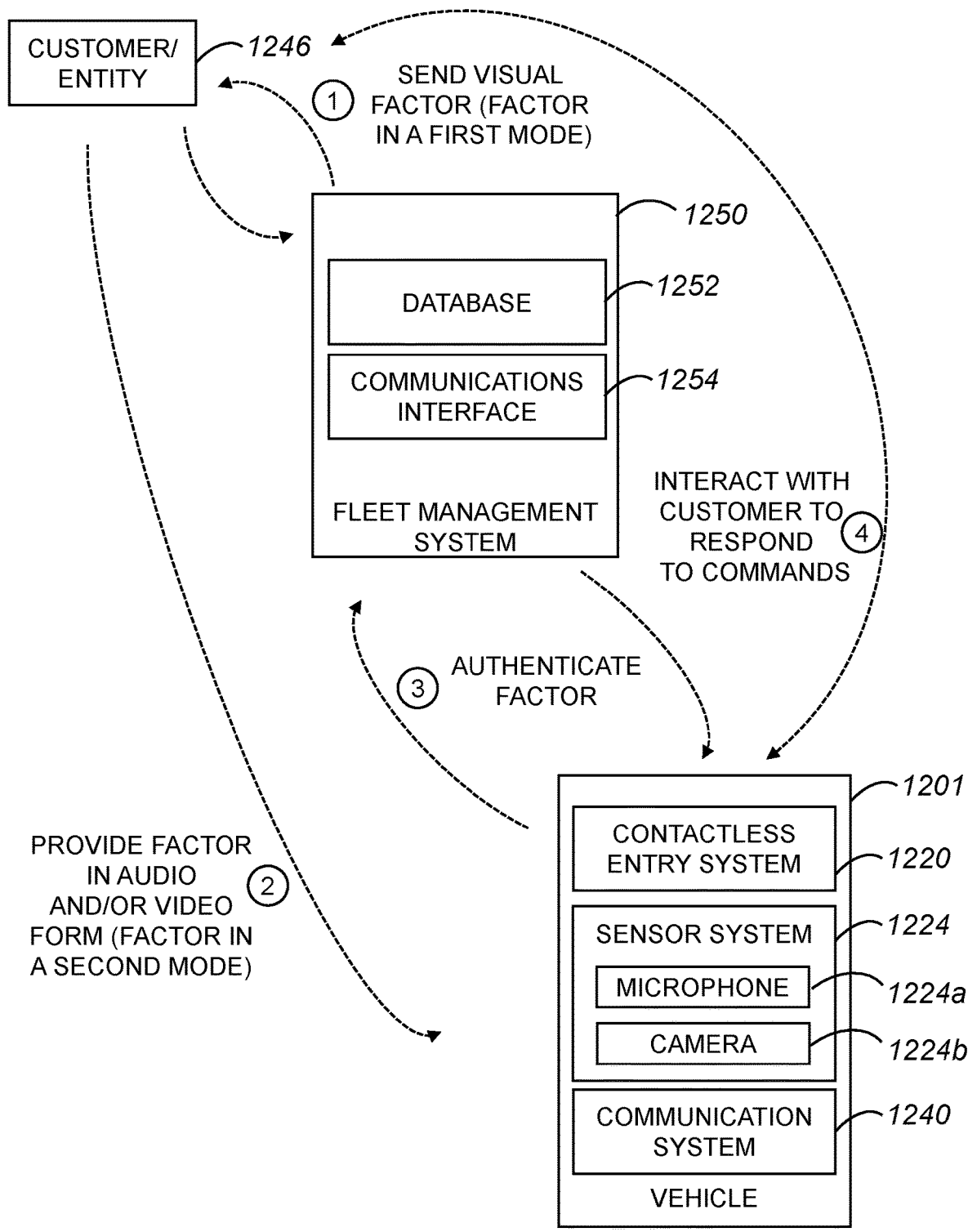
FIG. 12 is a diagrammatic representation of a process of providing a customer with a factor of authentication in one mode that is to be translated into another mode to enable a vehicle to interact with a customer in accordance with an embodiment.

FIG. 12 is a diagrammatic representation of a process of providing a customer with a factor of authentication in one mode that is to be translated into another mode to enable a vehicle to interact with a customer in accordance with an embodiment. A customer or an entity 1246 may communicate with a system 1250, which may be a fleet management system, in order to obtain an instruction or an authentication factor in a first mode that may be used by customer 1246 in an authentication process with a vehicle 1201 to enable customer 1246 to interact with vehicle 1201 to perform an operation, e.g., to provide access to a compartment and/or to drive to a particular location. Customer 1246, system 1260, and vehicle 1201 may be part of an overall platform which allows for vehicle 1201 to deliver, e.g., autonomously deliver, items and/or services to customer 1246 in a substantially contactless manner.

Fleet management system 1250 may be associated with an enterprise which dispatches vehicle 1201 and/or manages a fleet of vehicles that includes vehicle 1201. In one embodiment, fleet management system 1250 may be associated with a retailer that delivers or otherwise dispatches goods using vehicle 1201. Fleet management system 1250 may generally store information relating to customer 1246 in a database 1252, and may communicate with customer 1246 and/or with vehicle 1101 using a communications interface 1254. Communications interface 1254 may be arranged to support communications, e.g., wireless network communications, including, but not limited to including, cellular communications, 3G/4G/5G communications, Bluetooth communications, and/or Wi-Fi communications.

When customer 1246 interacts with fleet management system 1250, customer 1246 may obtain information relating to an authentication factor from fleet management system 1250. The information may be provided using any suitable method including, but not limited to including, providing information on a website, providing information through an application, providing information via an email, providing information via a text or a chat message, and/or providing information via a printout.

In one embodiment, when customer 1246 communicates with fleet management system 1250, fleet management system 1250 may provide customer 1246 with an authentication factor in a first mode. Database 1252 may store a preference of customer 1246 as to a default mode or a mode preferred by customer 1246. For example, customer 1246 may prefer that a command be provided visually as a visual image of an object. The visual image provided to customer 1246 by fleet management system 1250 may be randomly generated.

Upon obtaining the visual authentication factor in a first mode or format, customer 1246 may issue a corresponding translation of the visual factor in a different mode or format to vehicle 1201. By way of example, when fleet management system 1250 provide a visual image of an object to customer 1246, customer 1246 may audibly name the object when interacting with vehicle 1201 to enable customer 1246 to be authenticated. Issuing or providing a factor in a second mode include, but is not limited to including, customer 1246 speaking into a microphone 1224a and/or being captured on a camera 1224b of a sensor system 1224 of vehicle 1201. Vehicle 1201 may communicate with fleet management system 1250 using communication system 1240 to determine whether the factor provided by customer 1246 is authenticated, i.e., whether vehicle 1201 may interact with customer 1246 to perform one or more operations.

If the factor is authenticated, then vehicle 1201 may interact with customer 1246 to execute or otherwise perform operations. By way of example, if customer 1246 is effectively authenticated, then vehicle 1201 may obtain commands from customer 1246 using any suitable method, and may perform operations in response to the commands. The commands may include, but are not limited to including, enabling a contactless entry system 1220 of vehicle 1201 to provide customer 1246 with access to a compartment on vehicle 1201.

Figure 13:
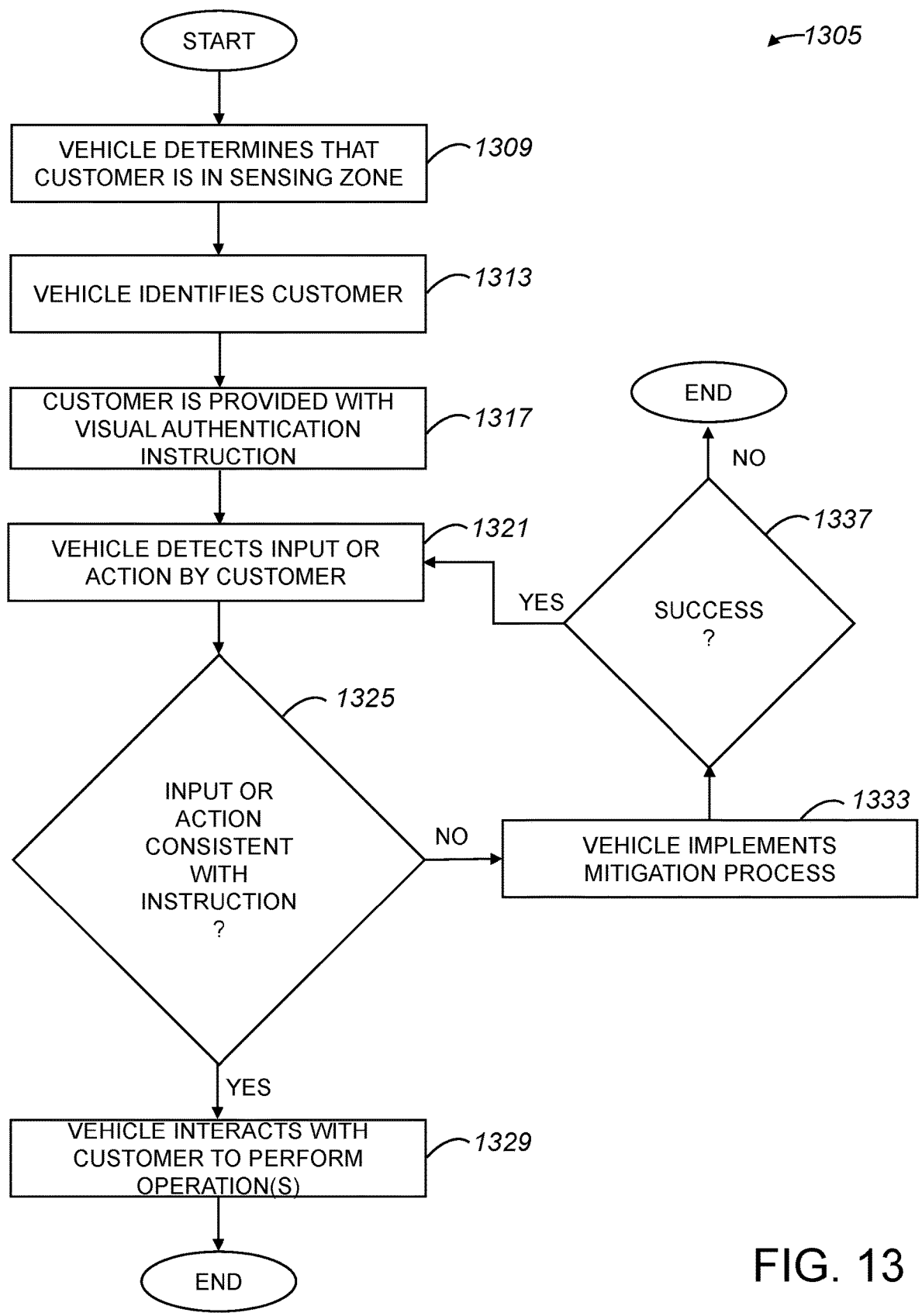
FIG. 13 is a process flow diagram which illustrates a method of performing authentication which includes translating an authentication factor from one mode to another in accordance with an embodiment.

FIG. 13 is a process flow diagram which illustrates a method of performing authentication which includes translating an authentication factor from one mode to another mode in accordance with an embodiment. A method 1305 of performing authentication which includes translating an authentication factor from one mode to another begins at a step 1309 in which a vehicle determine that a customer is within a sensing zone of the vehicle. That is, the vehicle determines that a customer is within proximity. Such a determination may include, but is not limited to including, identifying when a device in the possession of the customer is detected within the sensing zone and/or determining when the customer himself or herself is detected within the sensing zone.

In a step 1313, the vehicle identifies the customer, and in a step 1317, the customer is provided with a visual authentication instruction or, more generally, an authentication instruction in a first format or mode. The authentication instruction may be provided in a first mode by a fleet management system when the vehicle notifies the fleet management system that the customer is within the sensing zone, or the vehicle may substantially directly provide the customer with the authentication instruction.

Once the customer is provided with the visual authentication instruction, the vehicle detects whether there is an input or an action by the customer in a step 1321. That is, the vehicle determines whether the customer has provided the authentication instruction in a second format or mode. Such a determination may be made using sensors on the vehicle including, but not limited to including, a microphone and/or a camera.

A determination is made in a step 1325 as to whether the input or action detected in step 1321 is consistent with the authentication instruction. If the determination is that the input or action is consistent with the authentication instruction, then the customer is effectively authentication, or is otherwise deemed to be allowed to interact with the vehicle to command the vehicle. As such, in a step 1329, the vehicle interacts with the customer to perform one or more operations. For example, the customer may issue commands to the vehicle, and the vehicle may perform operations in response to the commands. Upon the vehicle interacting with the customer, the method of performing authentication which includes translating an authentication factor from one mode to another mode is completed.

Alternatively, if it is determined in step 1325 that the input or action is not consistent with the authentication instruction, then in a step 1333, the vehicle implements a mitigation process. The mitigation process may be arranged to determine why the input or action was not consistent with the instruction, and may include the vehicle interacting with the customer. After the vehicle implements the mitigation process, it is determined in a step 1337 whether the mitigation process was successful. If the determination is that the mitigation process was successful, then process flow returns to step 1321 in which the vehicle once again detects an input or n action by the customer. Alternatively, if the determination is that the mitigation process was not successful, then the method of performing authentication which includes translating an authentication factor from one mode to another mode is terminated.

In one embodiment, a customer may effectively interact with a vehicle through a fleet management system when the customer is not within a particular range of a physical location of the vehicle. When the customer and the vehicle are physically positioned such that the customer is within a particular range, e.g., within a sensing zone, around the vehicle, at that point in time, the vehicle may respond to customer commands. For example, for security reasons, a customer may be prevented from commanding the vehicle unless the vehicle is within a physical line-of-sight of the customer. While the customer may essentially communicate with the vehicle through a fleet management system when the customer is not within a particular range of the vehicle, the vehicle may not take any actions in response to such communications until the customer is within a predetermined distance from the vehicle.

Figure 14A:
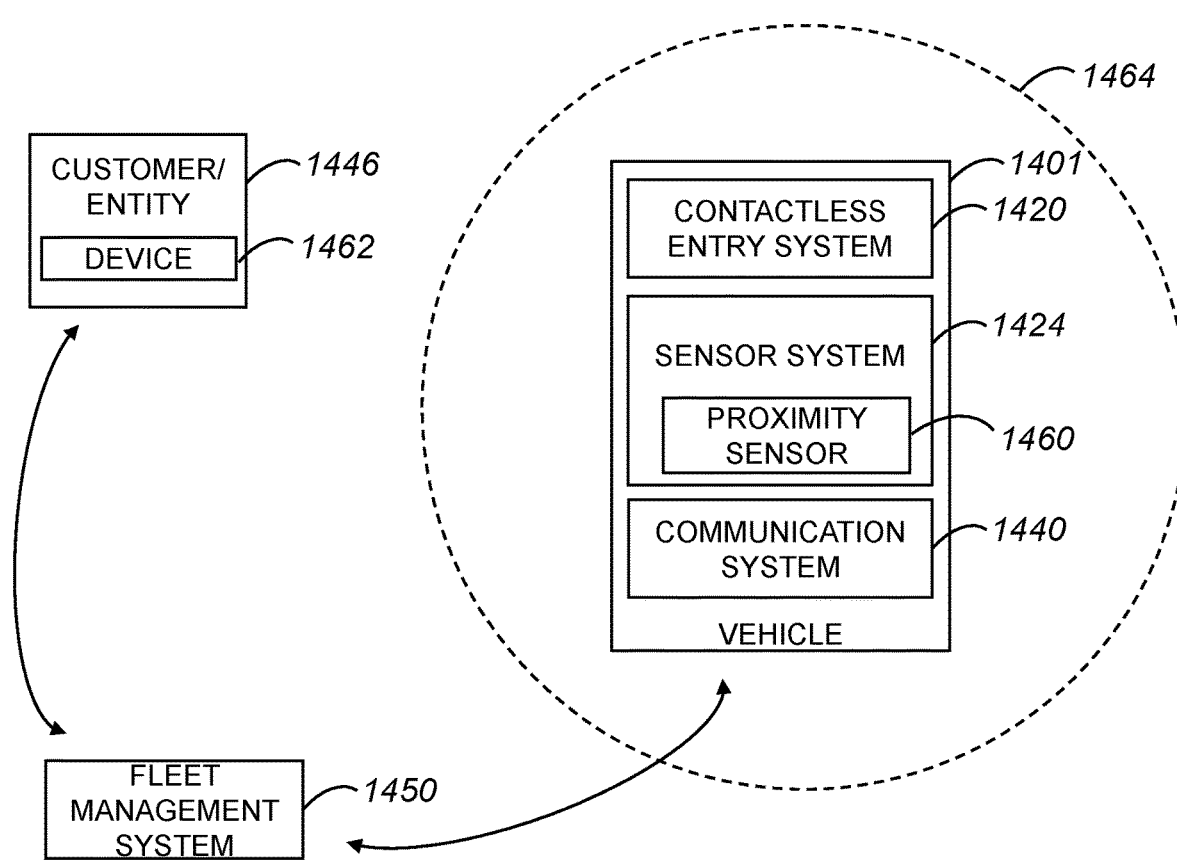
FIG. 14A is a diagrammatic representation of a customer interacting with a fleet management system at a time t1 while the customer is outside of a physical range around a vehicle in accordance with an embodiment.
Figure 14B:
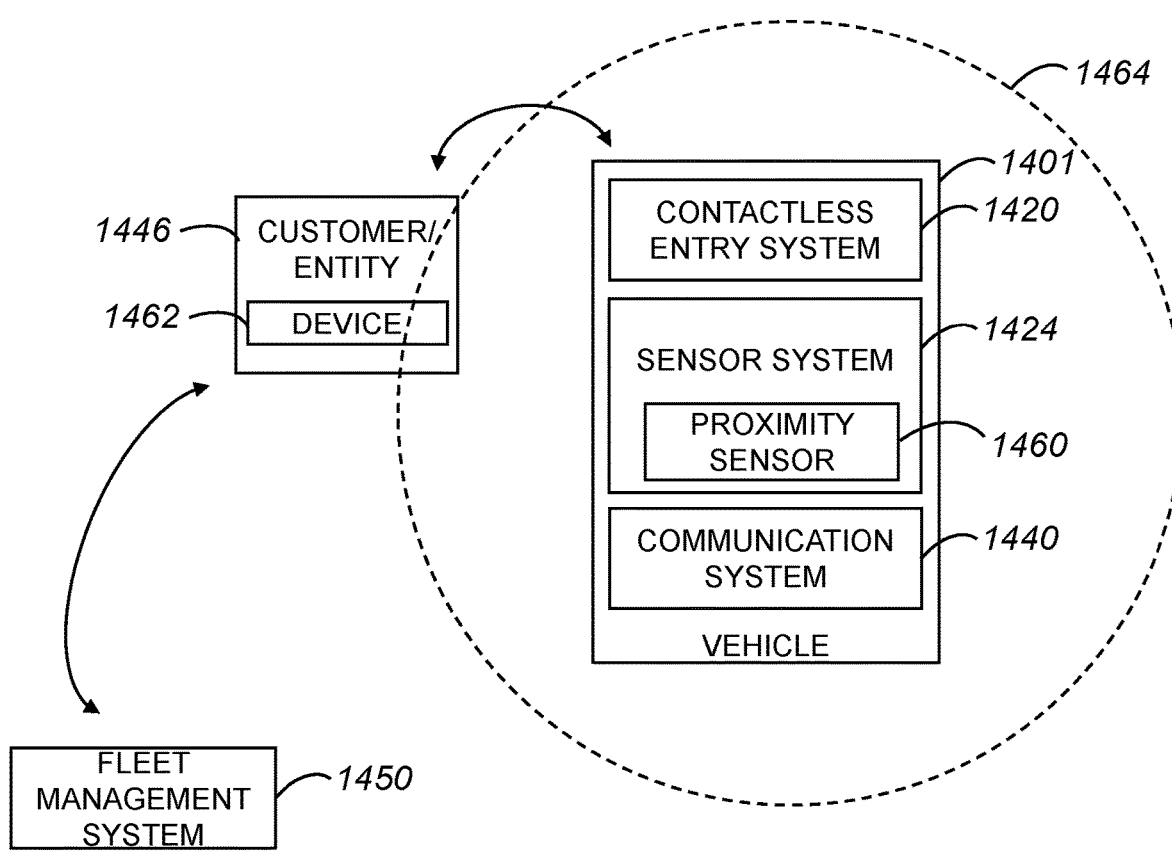
FIG. 14B is a diagrammatic representation of a customer interacting with a vehicle, e.g., customer 1446 and vehicle 1401 of FIG. 14A, at a time t2 when the customer is within of a physical range, e.g., physical range 1464 of FIG. 14A. around the vehicle in accordance with an embodiment.

With reference to FIGS. 14A and 14B, the interactions of a customer with a vehicle depending upon the proximity of the customer to the vehicle will be discussed in accordance with an embodiment. FIG. 14A is a diagrammatic representation of a customer interacting with a fleet management system at a time t1 while the customer is outside of a physical range around a vehicle in accordance with an embodiment. At a time t1, a customer or entity 1446 that has a device 1462 interacts with a fleet management system 1450. Device 1462 may be any suitable device which enables customer 1446 to communicate across a network, e.g., device 1462 may be a smartphone on which an application which facilitates communications with fleet management system 1450 and a vehicle 1401 may execute.

In one embodiment, while customer 1446 may be substantially prevented from interacting directly with vehicle 1401 while customer 1446 is outside of a sensing zone or predetermined range 1464 around vehicle 1401, customer 1446 may use device 1462 to communicate with fleet management system 1450 which may also communicate with vehicle 1401. That is, fleet management system 1450 may effectively serve as an intermediary for communications between device 1462 and vehicle 1440 while device 1462 is outside of sensing zone 1464.

Customer 1446 may use device 1462 in an authentication process with fleet management system 1450 such that customer 1446 is effectively verified as an intended recipient of goods and or services to be provided by vehicle 1401. In other words, fleet management system 1450 may authenticate customer 1446 with respect to vehicle 1401, and may communicate via a communication system 1440 of vehicle 1401 that customer 1446 is authenticated.

Once customer 1446 is authenticated, a sensor system 1424 of vehicle may monitor sensing zone 1464 to determine whether device 1462 is within sensing zone 1464. For example, sensor system 1424 may include a proximity sensor 1460 which may determine when customer 1446 and/or device 1462 is within sensing zone 1464. Until customer 1446 and/or device 1462 are detected within sensing zone 1464, vehicle 1401 may not perform operations intended for customer 1446. By way of example, a contactless entry system 1420 which provides customer 1446 with access to contents stored in a compartment (not shown) of vehicle may not provide customer 1446 with the ability to access the contents until customer 1446 and/or device 1462 are within sensing zone 1464.

At a time t2, as shown in FIG. 14B, customer 1446 and device 1462 are at least partially within sensing zone 1464. In the described embodiment, proximity sensor 1460 senses that device 1462 is present within sensing zone 1464 at time t2, and essentially trigger contactless entry system 1420 to provide access to contents or services associated with vehicle 1401 that are intended for customer 1446. For example, contactless entry system 1420 may provide an interface on device 1462 that enables customer 1446 to substantially open a compartment (not shown) that contains contents, or contactless entry system 1420 may cause the compartment to open upon detecting device 1462 within sensing zone 1464.

Figure 15:
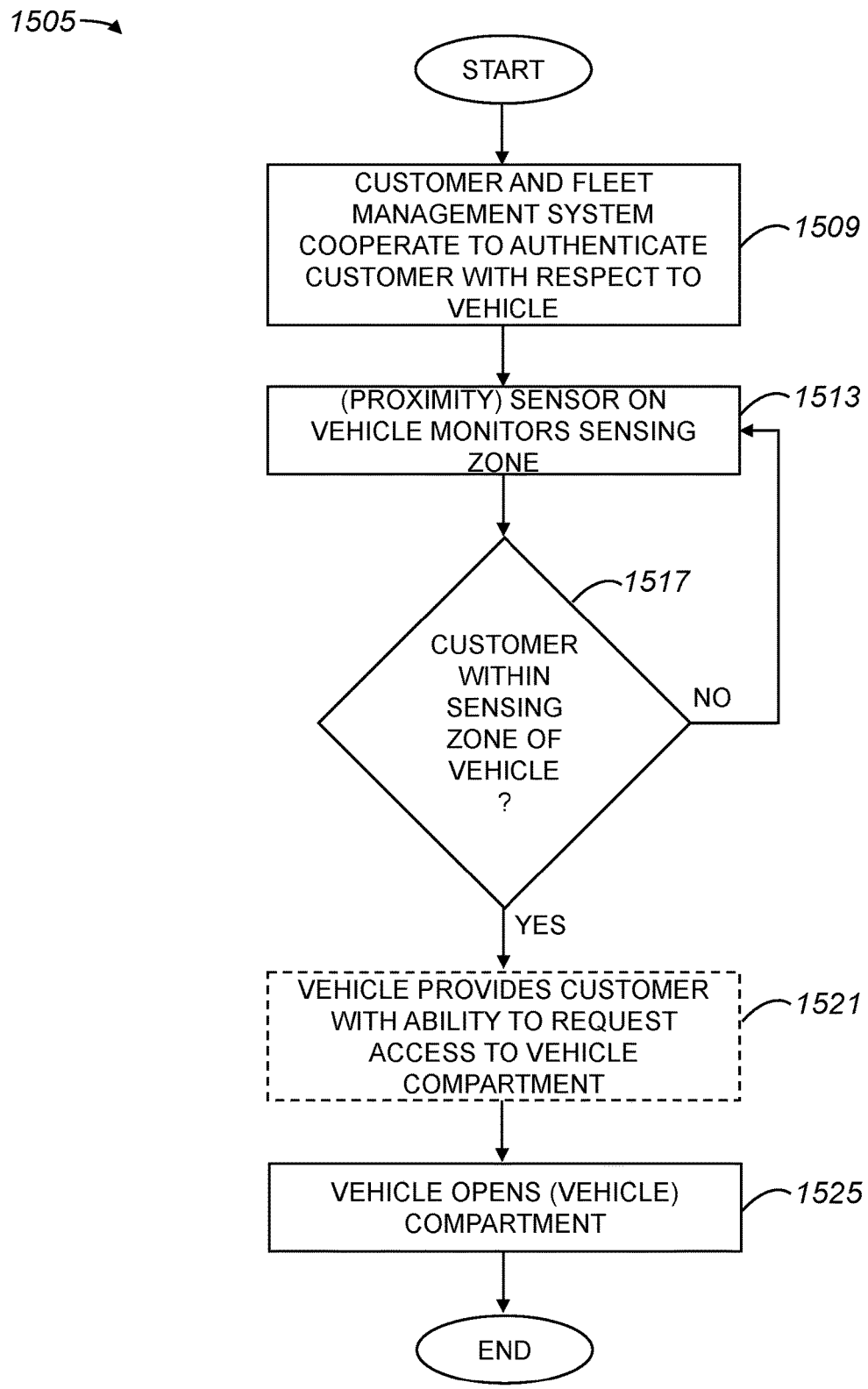
FIG. 15 is a process flow diagram which illustrates a method of providing a customer with access to a compartment of a vehicle when the customer is within a sensing zone of the vehicle in accordance with an embodiment.

FIG. 15 is a process flow diagram which illustrates a method of providing a customer with access to a compartment of a vehicle when the customer is within a sensing zone of the vehicle in accordance with an embodiment. A method 1505 of providing a customer with access to a compartment of a vehicle begins at a step 1509 in which a customer is authenticated with respect to a vehicle. In one embodiment, authenticating the customer with respect to the vehicle involves the customer communicating with a fleet management system which dispatches and/or monitors the vehicle. The fleet management system may determine whether the customer is who he or she purports to be, and may interact with the customer to ascertain whether the customer is authorized to access contents of the vehicle.

After the customer is authenticated, a sensor on the vehicle monitors the sensing zone in a step 1513. The sensor may be a proximity sensor which is arranged to determine when the customer, and/or a device in the possession of the customer, is within a particular distance away from the vehicle. The sensor, however, is not limited to being a proximity sensor and may generally be any suitable sensor such as a camera, a motion detector, a sound sensor, and/or a microphone.

A determination is made in a step 1517 as to whether the sensor has detected the customer within the sensing zone. That is, it is determined whether a customer is in physical proximity to the vehicle. If it is determined that the customer is not within the sensing zone, then process flow returns to step 1513 in which the sensor continues to monitor the sensing zone.

Alternatively, if the determination in step 1517 is that the customer is within the sensing zone, the indication is that the vehicle may enable the customer to remove contents from a compartment. Accordingly, in an optional step 1521, the vehicle may provide the customer with an ability to request access to a compartment of the vehicle. That is, the vehicle may optionally provide the customer with an interface which enables the customer to effectively open a compartment and/or a sub-compartment within the compartment. The interface may be, but is not limited to being, a user interface presented on a device in the possession of the customer that substantially denies the customer an ability to request access to a compartment while the customer is not within the sensing zone. Such a user interface may be configured to enable the customer to request access to a compartment when the customer is within the sensing zone.

From optional step 1521 or from step 1517, process flow proceeds to a step 1525 in which the vehicle opens the compartment, e.g., in a contactless manner. The vehicle may cause a door and/or cover on the compartment to unlock and to substantially automatically open. It should be appreciated that before opening the compartment, the vehicle may use sensors on the vehicle to determine whether it is safe to open the compartment. By way of example, before opening the compartment, the vehicle may ascertain whether there is any person standing too close to the compartment and/or whether the compartment is obstructed by an object which may prevent the opening of the compartment. Once the vehicle opens the compartment, the method of providing a customer with access to a compartment of a vehicle is completed.

As mentioned above, while a customer may effectively interact with a vehicle through a fleet management system when the customer is not within a particular range of a physical location of the vehicle, the customer may not be provided with an ability to access contents of a compartment of the vehicle and/or an ability to issue commands to the vehicle until the customer is within a sensing zone around the vehicle. In one embodiment, once a customer or a device associated with the customer is detected in a sensing zone around the vehicle, the vehicle may provide the customer with an ability to access a compartment on the vehicle by activating a sensor which may be used to effectively open the compartment in a contactless manner. Such a sensor may be substantially inactive or not activated while the customer is outside of the sensing zone.

Figure 16A:
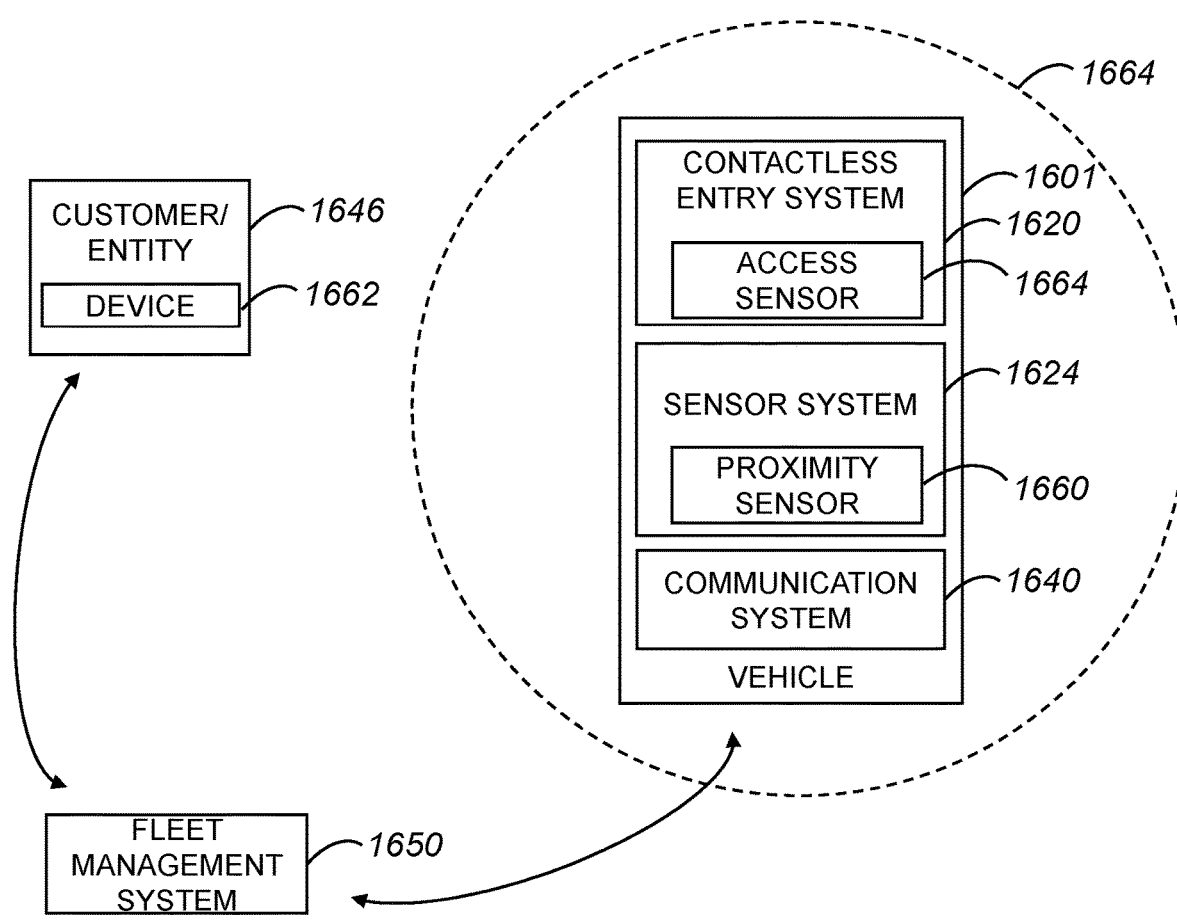
FIG. 16A is a diagrammatic representation of a customer interacting with a fleet management system at a time t1 while the customer is outside of a physical range around a vehicle with an activatable sensor in accordance with an embodiment.
Figure 16B:
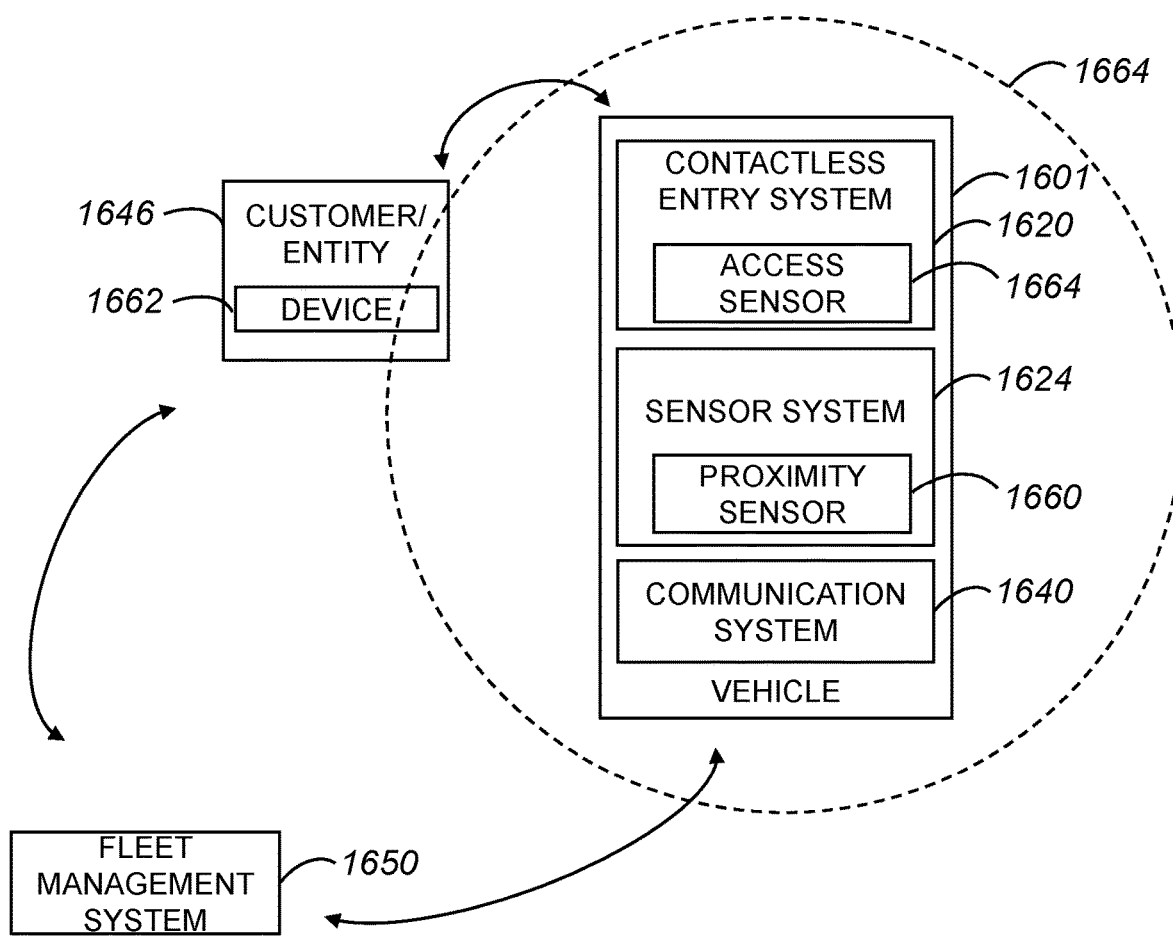
FIG. 16B is a diagrammatic representation of a customer interacting with a vehicle, e.g., customer 1646 and vehicle 1601 of FIG. 16A, at a time t2 when the customer is within of a physical range, e.g., physical range 1664 of FIG. 16A. around the vehicle in accordance with an embodiment.

Referring next to FIGS. 16A and 16B, the interactions of a customer with a vehicle depending upon the proximity of the customer to the vehicle with an activatable sensor will be discussed in accordance with an embodiment. FIG. 16A is a diagrammatic representation of a customer interacting with a fleet management system at a time t1 while the customer is outside of a physical range around a vehicle with an activatable sensor in accordance with an embodiment. At a time t1, a customer or entity 1646 that has a device 1662 interacts with a fleet management system 1650 as part of an authentication process that, if successful, may provide customer 1646 with the ability to access contents carried on vehicle 1601 and/or to issue commands to vehicle 1601.

Customer 1646 may be substantially prevented from interacting directly with vehicle 1601 while customer 1646 is not within a sensing zone or predetermined range 1664 around vehicle 1601. However, customer 1646 may use device 1662 to communicate with fleet management system 1650, and fleet management system 1650 may communicate with vehicle 1601. In other words, fleet management system 1650 may effectively serve as an intermediary for communications between device 1662 and vehicle 1640 while device 1662 is outside of sensing zone 1664.

Customer 1646 may use device 1662 in an authentication process with fleet management system 1650 such that customer 1646 is effectively verified as an intended recipient of goods and or services to be provided by vehicle 1601. That is, fleet management system 1650 may authenticate customer 1646 with respect to vehicle 1601, and may communicate via a communication system 1640 of vehicle 1601 that customer 1646 is authenticated.

Once customer 1646 is authenticated, a sensor system 1624 of vehicle may monitor sensing zone 1664 to determine when device 1662 is present within sensing zone 1664. Sensor system 1624 may include a proximity sensor 1660 which may determine when customer 1646 and/or device 1662 is within sensing zone 1664. Until customer 1646 and/or device 1662 are detected as being present within sensing zone 1664, vehicle 1601 may be arranged to substantially prevent customer 1646 from interacting with vehicle 1601 and/or issuing commands to vehicle 1601. For example, a contactless entry system 1620 which provides customer 1646 with access to contents stored in a compartment (not shown) of vehicle may include an access sensor 1664 which may be activated by vehicle 1601 to effectively provide customer 1646 with the ability to access the contents. The contactless entry system 1620 may not activate access sensor 1664 until customer 1446 and/or device 1462 are within sensing zone 1464. In other words, access sensor 1664 is not activated for use until customer 1446 and/or device 1462 are detected within sensing zone 1664.

Access sensor 1664 may be any suitable sensor which effectively controls access to a compartment, or control an ability for customer 1646 to provide instructions to vehicle 1601 that vehicle 1601 may obey or otherwise follow. In one embodiment, access sensor 1664 may be a motion sensor which is configured to detect when customer 1646 effectively waves something that is detected by the motion sensor and, when motion is detected, causes vehicle 1601 to take an action, e.g., open a compartment door (not shown). In another embodiment, access sensor 1664 may include a camera which detects when customer 1646 is making motions which indicate that customer 1646 is commanding vehicle 1601 to take an action.

At a time t2, as shown in FIG. 16B, customer 1646 and device 1662 are at least partially within sensing zone 1664. In the described embodiment, proximity sensor 1660 senses that device 1662 is present within sensing zone 1664 at time t2, and essentially activates access sensor 1664 such that customer 1646 may use access sensor 1664 to open a compartment door (not shown) in a contactless manner, as for example to gain access to contents or services contained in the compartment that are intended for customer 1646.

Figure 17:
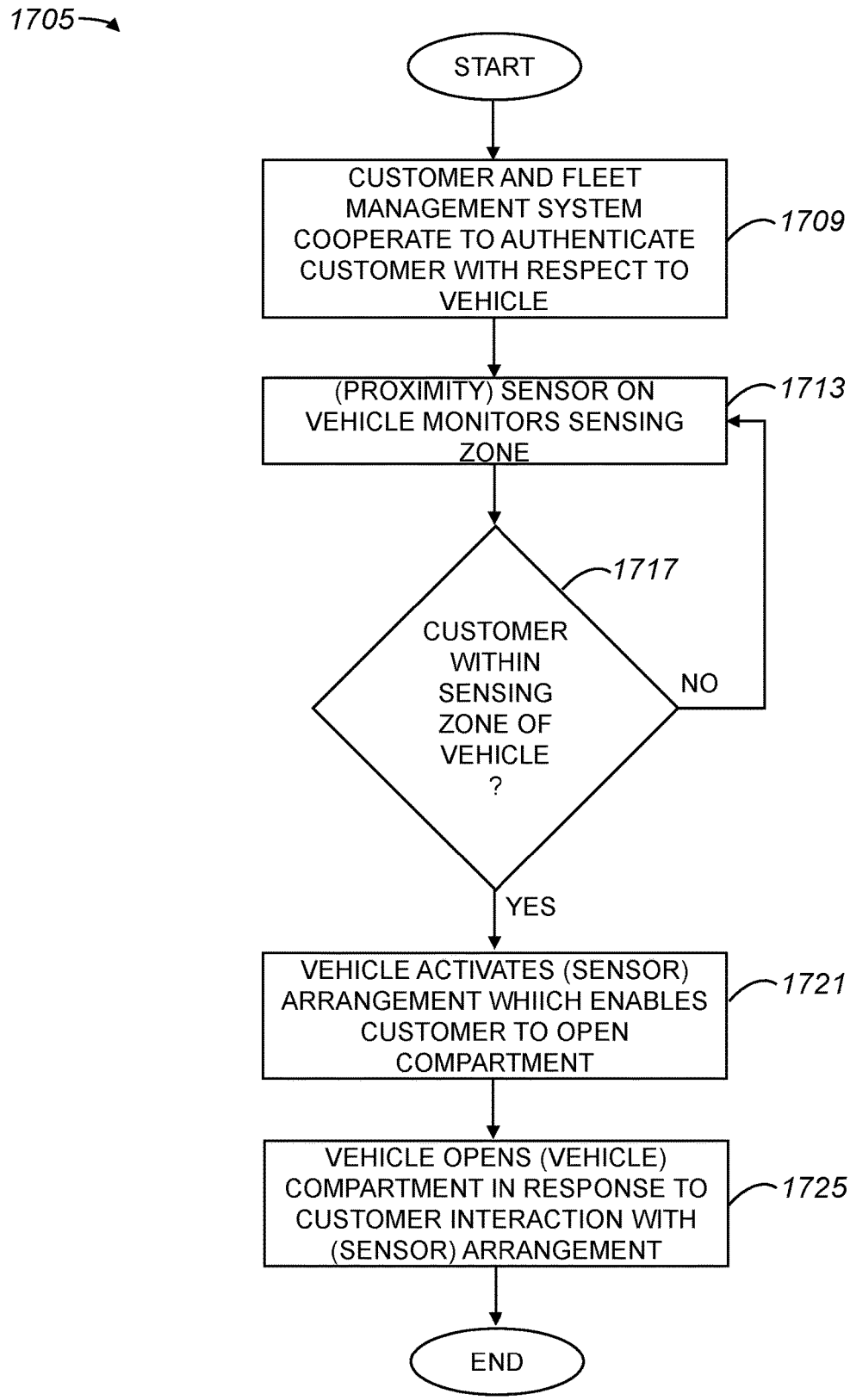
FIG. 17 is a process flow diagram which illustrates a method of providing a customer with access to a compartment of a vehicle when the customer is within a sensing zone of the vehicle and an activatable sensor arrangement is activated in accordance with an embodiment.

FIG. 17 is a process flow diagram which illustrates a method of providing a customer with access to a compartment of a vehicle when the customer is within a sensing zone of the vehicle and an activatable sensor arrangement is activated in accordance with an embodiment. A method 1705 of providing a customer with access to a compartment of a vehicle begins at a step 1709 in which a customer is authenticated with respect to a vehicle through cooperation between the customer, e.g., through a device in the possession of the customer, and a fleet management system. The fleet management system may utilize information provided by the customer to ascertain whether the customer is legitimate, and may interact with the customer to ascertain whether the customer has authorization to access contents of the vehicle.

After the customer is authenticated, a sensor on the vehicle monitors the sensing zone in a step 1713. The sensor may be a proximity sensor which is arranged to determine when the customer, and/or a device in the possession of the customer, is within the sensing zone. The sensor, however, is not limited to being a proximity sensor and may generally be any suitable sensor such as a camera, a motion detector, a sound sensor, and/or a microphone. In one embodiment, the sensor may be arranged to determine when a signal from a device, e.g., a Bluetooth signal from a cell phone, of the customer is detected within the sensing zone.

It is determined in a step 1717 whether the sensor has detected the customer within the sensing zone. That is, it is determined whether a customer is in physical proximity to the vehicle. If it is determined that the customer is not within the sensing zone, then process flow returns to step 1713 in which the sensor continues to monitor the sensing zone.

Alternatively, if it is determined in step 1717 is that the customer is within the sensing zone, the indication is that the vehicle may enable the customer to remove contents from a compartment or, more generally, enable the customer to interact substantially directly with the vehicle. As such, process flow moves to a step 172 in which the vehicle activates an arrangement, e.g., a sensor arrangement, which enables the customer to open a compartment on the vehicle. The arrangement which is activated may generally be inactive until the customer is within the sensing zone of the vehicle. By not activating the arrangement until the customer is effectively in proximity to the vehicle, the contents of the compartment may be substantially protected from being accessed by an unauthorized party while the customer is not in relatively close vicinity to the vehicle. In one embodiment, the arrangement may include a motion sensor which may be activated by the vehicle such that the arrangement may be triggered by the customer to cause a door on the compartment to open, e.g., in a contactless manner.

After the vehicle activates the arrangement which enables the customer to open the compartment, the vehicle opens the compartment in a step 1725 in response to an interaction of the customer with the arrangement. That is, the customer may cause the vehicle to open the compartment by interacting with the activated arrangement. Once the vehicle opens the compartment, the method of providing a customer with access to a compartment of a vehicle is completed.

Although only a few embodiments have been described in this disclosure, it should be understood that the disclosure may be embodied in many other specific forms without departing from the spirit or the scope of the present disclosure. By way of example, actions performed by a user or a customer that are sensed by sensors on a vehicle have been described as actions which are requests or commands relating to a compartment on the vehicle. While actions may be used to enable substantially contactless opening and/or closing of a door to a compartment, actions are not limited to being related to a compartment. Actions may also include, but are not limited to including, requests or commands for the vehicle to activate or deactivate headlights, requests or commands for the vehicle to reposition itself, requests or commands for the vehicle to spray a cleaning substance such as a disinfectant, requests or commands for the vehicle to activate a screen to enable the customer to communicate with a party such as a customer service agent, etc.

Actions such as gestures or other movements may be substantially defined by any party associated with a vehicle, a fleet management system, a retailer, and/or a customer. For instance, a retailer may define standard gestures or movements that it expects customers to perform when interacting with a vehicle associated with the retailer. Alternatively, a customer may select gestures or movements that he or she would like to use to issue commands to a vehicle.

Similarly, modes used to provide information for authentication may vary widely. A first mode in which to provide a customer with authentication information and/or a second mode that the customer is to substantially translate the authentication information into may be substantially defined by any party associated with a vehicle, a fleet management system, a retailer, and/or a customer. For instance, a retailer may specify a mode in which a password is to be presented to a customer, as well as the mode into which the customer is to translate the password when interacting with a vehicle associated with the retailer. Alternatively, a customer may select the modes.

In general, actions that may be performed to issue a command to a vehicle may vary widely. Additionally, actions that may be performed to issue a command may vary depending upon a number of different factors. By way of example, a customer, as well as friends and/or family of the customer, may use a particular action to command a vehicle to execute an operation. Actions may also be defined based on geography or location, e.g., all occupants of a building may use a particular action to command a vehicle to execute an operation. Actions may also be defined based on the type of item that is carried in a compartment of an autonomous delivery vehicle, e.g., a complicated sequence of actions may be performed to access alcohol or medicine carried in a compartment while a relatively simple action may be performed to access inexpensive items. When alcohol is to be accessed, it should be understood that actions taken may include in field sobriety tests, e.g., a customer may be requested to walk in a straight line or to perform tasks to indicate whether he or she is sober or inebriated.

For a multi-factor authentication, the different factors used to authenticate a customer may be selected by different parties. By way of example, for a two-factor authentication, a first factor may be selected by a retailer or a fleet management system, and a second factor may be selected by a customer. Once the factors are selected, the factors may be stored in a database that is accessible to the fleet management system. In one embodiment, a delivery contained in a compartment may be prevented from being accessed until multiple parties each provide a factor in an authentication, e.g., a delivery contained in a compartment may remain secured until multiple customers are effectively authenticated.

In one embodiment, either a customer or a fleet management system may determine whether verification or authentication of the customer is to be established prior to the customer issuing a command to a vehicle. That is, a determination of whether an authentication process is needed before a particular action taken by a customer prior to allowing the customer to issue a command to the vehicle may be made by either the customer or by a fleet management system.

Generally, when an authentication process is used to determine whether a customer will be allowed to issue a command to a vehicle using an action, the action may serve as both an authenticating means and a command. That is, an authentication process may either verify the identity of a customer and allow the customer to issue a command to a vehicle, or verify that a command has been issued. It should be appreciated, however, the authentication of a customer may be substantially separate from the issuance of a command by the customer. For instance, an identification card of a customer or a facial recognition of the customer may be used to authenticate the customer prior to the customer making an action such as a gesture or a movement intended to command a vehicle.

While a gesture or gestures have generally been described as being associated with a particular operation to be performed by a vehicle, it should be appreciated that the same gesture or gestures may be used to command the vehicle to perform an operation and to essentially stop or undo the operation. By way of example, a thumbs up gesture may indicate that a closed door on a compartment of the vehicle is to be opened, and the same thumbs up gesture may indicate that an open door on the compartment is to be closed.

It should be appreciated that contactless or contact-free access to a compartment generally encompasses the ability of an individual to gain access to the compartment substantially without having to physically touch the vehicle. In other words, contactless access may include, but is not limited to including, touchless access, hands-free access, non-tactile access, and/or any type of access that does not involve an individual physically touching any part of the vehicle to cause access to be granted or otherwise provided. Contactless access may also include substantially any type of access that may be provided without an individual using a device or an object that physically touches the vehicle. For instance, placing a device in proximity to the vehicle may enable communications between the device and the vehicle, e.g., a QR code or a bar code on the device may be scanned to grant access in a contactless manner.

The use of multi-factor authentication which involves utilizing at least one gesture or movement may be applicable in any suitable situation. For example, when there are concerns that authentication information may be misappropriated or otherwise misused, multi-factor authentication may be used to mitigate such concerns. The modes of authentication may be selected by any party involved in a delivery, e.g., the modes may be selected by a customer. In one embodiment, multi-factor authentication may be used to provide an extra level of security when a vehicle delivers alcohol, prescriptions, other controlled substances, and/or expensive items. When a vehicle delivers alcohol, the vehicle may engage in two-factor authentication to verify that a customer or recipient of the alcohol is of a legal age to receive the alcohol, and/or verified to be the customer or an agent of the customer who ordered the alcohol. Such verification may include a first factor that verifies that a customer "matches" a government-issued identification card such as a driver's license or a passport that is effectively stored in a database and/or presented by the customer to a scanner or sensor on the vehicle, e.g., the customer may hold his or her identification card up to a camera on the vehicle. Facial recognition may be used to verify that the customer is the individual identified on the identification card. To further ensure that the customer is an intended recipient of the alcohol, the customer may perform at least one gesture or movement that is known by the vehicle, or by a fleet management system, as being a factor of a multi-factor authentication. The gesture or movement may be predetermined, e.g., known to the customer prior to the arrival of the vehicle at a customer location, or may be provided to the customer after the customer is at least partially verified using a first factor.

In general, determinations may be made regarding which gestures are valid, and/or which gestures are arranged to indicate that certain operations are requested, e.g., to indicate which operations are to be performed by an autonomous delivery vehicle. The gesture or gestures used, and/or the operations associated with the gestures, may be determined by a customer, a fleet management system and/or an enterprise associated with the fleet management system, e.g., a retailer.

While a customer has generally been described as being provided with an ability to command a vehicle such as an autonomous delivery vehicle in a substantially contactless manner, it should be appreciated that other users of a vehicle may also command a vehicle in a contactless manner. For example, an individual working for a retailer with multiple vehicles may command the vehicles in a contactless manner to position themselves in a particular order or in particular positions for loading. In addition, an operator who performs maintenance on a vehicle may command the vehicle in a contactless manner such that the operator may access different features of the vehicle. For instance, an operator may command a vehicle to provide data over a network, or the operator may command the vehicle to unlock a sensor mount so that the operator may remove a sensor from the vehicle.

An autonomous vehicle has generally been described as a land vehicle, or a vehicle that is arranged to be propelled or conveyed on land. It should be appreciated that in some embodiments, an autonomous vehicle may be configured for water travel, hover travel, and or/air travel without departing from the spirit or the scope of the present disclosure.

The embodiments may be implemented as hardware, firmware, and/or software logic embodied in a tangible, i.e., non-transitory, medium that, when executed, is operable to perform the various methods and processes described above. That is, the logic may be embodied as physical arrangements, modules, or components. For example, the systems of an autonomous vehicle, as described above with respect to FIG. 3, may include hardware, firmware, and/or software embodied on a tangible medium. A non-transitory storage medium, or a tangible medium, may be encoded with code devices that are executed by at least one processor. A tangible medium may be substantially any computer-readable medium that is capable of storing logic or computer program code which may be executed, e.g., by a processor or an overall computing system, to perform methods and functions associated with the embodiments. Such computer-readable mediums may include, but are not limited to including, physical storage and/or memory devices. Executable logic may include, but is not limited to including, code devices, computer program code, and/or executable computer commands or instructions.

It should be appreciated that a computer-readable medium, or a machine-readable medium, may include transitory embodiments and/or non-transitory embodiments, e.g., signals or signals embodied in carrier waves. That is, a computer-readable medium may be associated with non-transitory tangible media and transitory propagating signals.

The steps associated with the methods of the present disclosure may vary widely. Steps may be added, removed, altered, combined, and reordered without departing from the spirit of the scope of the present disclosure. By way of example, a multi-factor authentication process has been described in FIG. 8 as including two-factors. It should be appreciated that any number of factors may be a part of a multi-factor authentication process. Further, the use of at least one gesture or movement as one of the factors of a multi-factor authentication process may be associated with a first factor rather than a second factor without departing from the spirit or the scope of the disclosure. Therefore, the present examples are to be considered as illustrative and not restrictive, and the examples are not to be limited to the details given herein, but may be modified within the scope of the appended claims.

What is claimed is:

1. A method comprising:
   determining when a vehicle has arrived at a destination, wherein a sensing zone is defined around the vehicle;
   performing a first authentication process when it is determined that the vehicle has arrived at the destination, the first authentication process being arranged to authenticate a first party to enable the first party to interact with the vehicle wherein performing the first authentication process includes the first party providing at least a first authentication indicator;
   determining when the first party has successfully completed the first authentication process;
   performing a second process when it is determined that the first party has successfully completed the first authentication process, wherein performing the second process includes determining when the first party being present within the sensing zone;
   determining whether the second process is successfully completed; and
   enabling the first party to interact with the vehicle when it is determined that the second process is successfully completed, wherein the first authentication process and the second process are contactless with respect to the vehicle.

2. The method of claim 1 wherein the vehicle includes a sensor arrangement, the sensor arrangement being arranged to determine when the first party is present within the sensing zone, and wherein performing the second process includes determining whether the first party performs a recognized action using the sensor arrangement.

3. The method of claim 2 wherein enabling the first party to interact with the vehicle includes performing at least one operation in response to the recognized action when it is determined that the first party performs the recognized action.

4. The method of claim 2 wherein the recognized action is at least one motion performed by the first party.

5. The method of claim 1 wherein performing the second process includes providing the first party with an indicator in a first format, and wherein determining whether the second process is successfully completed includes determining whether the first party has provided the indicator in a second format, the second format being different from the first format.

6. The method of claim 1 wherein the vehicle includes a compartment, and wherein enabling the first party to interact with the vehicle includes opening the compartment to provide the first party with access to at least one content of the compartment.

7. The method of claim 1 wherein enabling the first party to interact with the vehicle includes enabling the first party to issue commands to the vehicle.

8. The method of claim 1 wherein determining when the first party has successfully completed the first authentication process includes verifying the first authentication indicator.

9. The method of claim 1 wherein performing the first authentication process includes the first party providing the at least a first authentication indicator when the first party outside of the sensing zone.

10. A non-transitory storage medium encoded with code devices that, when executed by at least one processor, cause the at least one processor to perform operations comprising:
  determining when a vehicle has arrived at a destination, wherein a sensing zone is defined around the vehicle;
  performing a first authentication process when it is determined that the vehicle has arrived at the destination, the first authentication process being arranged to authenticate a first party to enable the first party to interact with the vehicle wherein performing the first authentication process includes the first party providing at least a first authentication indicator;
  determining when the first party has successfully completed the first authentication process;
  performing a second process when it is determined that the first party has successfully completed the first authentication process, wherein performing the second process includes determining when the first party being present within the sensing zone;
  determining whether the second process is successfully completed; and
  enabling the first party to interact with the vehicle when it is determined that the second process is successfully completed, wherein the first authentication process and the second process are contactless with respect to the vehicle.

11. The non-transitory storage medium encoded with code devices of claim 10 wherein the vehicle includes a sensor arrangement, the sensor arrangement being arranged to determine when the first party is present within the sensing zone, and wherein performing the second process includes determining whether the first party performs a recognized action using the sensor arrangement.

12. The non-transitory storage medium encoded with code devices of claim 11 wherein enabling the first party to interact with the vehicle includes performing at least one operation in response to the recognized action when it is determined that the first party performs the recognized action.

13. The non-transitory storage medium encoded with code devices of claim 11 wherein the recognized action is at least one motion performed by the first party.

14. The non-transitory storage medium encoded with code devices of claim 10 wherein performing the second process includes providing the first party with an indicator in a first format, and wherein determining whether the second process is successfully completed includes determining whether the first party has provided the indicator in a second format, the second format being different from the first format.

15. The non-transitory storage medium encoded with code devices of claim 10 wherein the vehicle includes a compartment, and wherein enabling the first party to interact with the vehicle includes opening the compartment to provide the first party with access to at least one content of the compartment.

16. The non-transitory storage medium encoded with code devices of claim 10 wherein performing the first authentication process includes the first party providing the at least a first authentication indicator when the first party outside of the sensing zone.

17. A platform comprising:
  at least a first vehicle, the first vehicle being semi-autonomous or autonomous, wherein a first sensing zone is defined around the first vehicle;
  a system, the system arranged to communicate with the first vehicle, the system including a database, the database configured to store information associated with a first customer, wherein the system is arranged to perform a first authentication process for the first customer with respect to the first vehicle; and
  at least a first device, the first device configured to interact with the system to perform the first authentication process, wherein the first device is further configured to interact with the first vehicle after the first authentication process to perform a second process, wherein the first device and the first vehicle cooperate to perform the second process when the first device is identified by the first vehicle as being physically located in the first sensing zone.

18. The platform of claim 17 wherein the system is arranged to perform the first authentication process by obtaining a first indicator from the first device, comparing the first indicator with the information associated with the first customer, and determining whether the first indicator is consistent with the information, and wherein the first device is configured to interact with the first vehicle after the first vehicle process determines that the first indicator is consistent with the information.

19. The platform of claim 18 wherein the first device and the first vehicle interact to perform the second process when the first device provides a second indicator to the first vehicle and the first vehicle determines whether the second indicator is verified.

20. The platform of claim 19 wherein when the first vehicle determines that the second indicator is verified the first vehicle enables the first customer to issue a command to the first vehicle.

21. The platform of claim 18 wherein the vehicle includes a first sensor, and wherein the first device and the first vehicle interact to perform the second process when the vehicle provides a second indicator to the first device and the first customer provides the second indicator to the vehicle for verification using the first sensor.

* * * * *